(12) United States Patent
Xu et al.

(10) Patent No.: US 12,187,899 B2
(45) Date of Patent: Jan. 7, 2025

(54) METHOD FOR IMPROVING ALKALI RESISTANCE AND OXIDATION RESISTANCE OF BENZOTHIAZOLE DISPERSE DYE

(71) Applicants: Qingdao University, Qingdao (CN); Penglai Jiaxin Dye Chemical Co., LTD, Penglai (CN)

(72) Inventors: Changhai Xu, Qingdao (CN); Xiaoyan Wang, Qingdao (CN); Jiaxue Yu, Penglai (CN); Liang He, Penglai (CN); Mingtao Qiu, Penglai (CN); Xinting Zhao, Penglai (CN); Jinmei Du, Qingdao (CN); Jinglin Tang, Penglai (CN)

(73) Assignees: Qingdao University, Shandong (CN); Penglai Jiaxin Dye Chemical Co., LTD, Shandong (CN)

( * ) Notice: Subject to any disclaimer, the term of this patent is extended or adjusted under 35 U.S.C. 154(b) by 166 days.

(21) Appl. No.: 17/392,463

(22) Filed: Aug. 3, 2021

(65) Prior Publication Data
US 2021/0363354 A1    Nov. 25, 2021

(30) Foreign Application Priority Data
Aug. 27, 2020    (CN) .......................... 202010877734.3

(51) Int. Cl.
*C09B 29/033*    (2006.01)
(52) U.S. Cl.
CPC ............................... *C09B 29/0088* (2013.01)
(58) Field of Classification Search
None
See application file for complete search history.

(56) References Cited

FOREIGN PATENT DOCUMENTS

| GB | 1411243 | A | * | 10/1975 | ............. | C09B 44/20 |
| GB | 1539513 | A | * | 1/1979 | ......... | C09B 29/0088 |
| WO | WO-2016033853 | A1 | * | 3/2016 | ................ | D06P 1/18 |

OTHER PUBLICATIONS

Wang et al. WO2016033853 A1, Bright Red Disperse Dye With High Alkaline Resistance, and Use, Preparation Method and Staining Method Thereof, English machine translation [online], downloaded on May 5, 2023 from <https://patentscope.wipo.int> (Year: 2023).*
Registry No. 13486-12-9, Chemical Abstract Service, STNext Database (online). Entered STN: Nov. 16, 1984 (Year: 1984).*
Registry No. 13486-45-8, Chemical Abstract Service, STNext Database (online). Entered STN: Nov. 16, 1984 (Year: 1984).*
Registry No. 58377-95-0, Chemical Abstract Service, STNext Database (online). Entered STN: Nov. 16, 1984 (Year: 1984).*
Registry No. 96123-88-5, Chemical Abstract Service, STNext Database (online). Entered STN: Apr. 8, 1985 (Year: 1985).*

* cited by examiner

*Primary Examiner* — Amanda L. Aguirre
(74) *Attorney, Agent, or Firm* — IPRO, PLLC; Na Xu

(57) ABSTRACT

The disclosure relates to a method for improving the alkali resistance and oxidation resistance of a benzothiazole disperse dye, and belongs to the field of disperse dyes. In the disclosure, 4 kinds of diazo components and 8 kinds of coupling components are used in designing and synthesizing 28 thiazole heterocyclic azo disperse dyes, and the alkali resistance and oxidation resistance of the disperse dyes are improved. Structure confirmation is performed on the synthetic disperse dyes, and the alkali resistance, oxidation resistance and other dyeing properties of the disperse dyes are tested. According to the method for improving the alkali resistance and oxidation resistance of the benzothiazole disperse dye provided in the disclosure, a relationship between a dye structure and the alkali resistance and oxidation resistance is determined, the disperse dyes with excellent alkali resistance and oxidation resistance are obtained, and the dyeing performance is stable under a dyeing condition of 10 g/L of sodium hydroxide or 5 g/L of hydrogen peroxide. This kind of dyes can be applied to a one bath for bleaching and dyeing of polyester and cotton and a one bath for deweighting and dyeing of polyester, dyeing and finishing in a short process are achieved, and great ecological and economic benefits are obtained.

1 Claim, 18 Drawing Sheets

METHOD FOR IMPROVING ALKALI RESISTANCE AND OXIDATION RESISTANCE OF BENZOTHIAZOLE DISPERSE DYE

TECHNICAL FIELD

The disclosure relates to a method for improving the alkali resistance and oxidation resistance of a benzothiazole disperse dye, and belongs to the field of disperse dyes.

BACKGROUND

Polyester is the most widely used fiber variety with the highest output in many synthetic fibers. Due to a unique linear macromolecular structure, fabrics made from polyester have good strength, elasticity, rubbing resistance, heat resistance and practicality. Since polyester has a compact fiber structure, a small molecular gap, high crystallinity and few hydrophilic groups in molecules, a disperse dye with a relatively low molecular weight is often used for dyeing. In order to achieve a good dyeing effect, fibers are usually heated during dyeing. Since polyester is a thermoplastic fiber, when the heating temperature is higher than the glass transition temperature (Tg) of polyester, the crystalline area in fibers is reduced, movement of macromolecular chains is increased, the intermolecular gap is increased, dyes adsorbed on fiber surfaces are gradually diffused into the fibers to enter an amorphous area of the fibers and then fixed, and finally a dyeing purpose is achieved.

Polyester oligomers are some by-products with a low polymerization degree and a low molecular weight formed in a polycondensation process of polyester. When a fabric is stained with the polyester oligomers, lots of difficult-to-remove tar spots are caused to the fabric, and the appearance and handfeel of a product are reduced. When the oligomers are diffused into a dyeing solution and then re-adsorbed onto the fabric, the color and luster of the fabric are reduced, and a gray and old feeling is caused. After the dyeing solution is cooled, precipitates of the remaining oligomers are formed and attached to equipment, a large amount of dirt is formed, not only is the fabric easily stained, but also the operation of the equipment is affected, and a certain difficulty in cleaning is caused. Therefore, the dyed fabric is usually subjected to reduction clearing to reduce the oligomers attached to the fabric so as to fully reduce the influence of the oligomers on the fabric. These problems can be solved by alkaline dyeing.

In order to reduce the process flow, shorten the processing time and improve the production efficiency, a one-bath process for cotton bleaching and disperse dyeing of a polyester-cotton blended fabric and a deweighting and dyeing process of polyester have been proposed in recent years, the selectivity for disperse dyes in these processes is high, and the disperse dyes are required to have high alkali resistance and oxidation resistance. With development of technologies, a series of alkali-resistant disperse dyes have been successively researched and produced, and it is found in long-term research and exploration processes that the alkali resistance of disperse dyes is mainly affected by the alkali resistance of substituents. However, there are few researches on oxidation resistance of disperse dyes, and a systematic relationship between dye molecular structures and the alkali resistance and oxidation resistance has not formed yet.

SUMMARY

In order to solve at least one problem above, the disclosure provides a method for improving the alkali resistance and oxidation resistance of a benzothiazole disperse dye.

In the disclosure, benzothiazole and derivatives are used as a diazo component, aniline derivatives are used as a coupling component, a series of disperse dyes are designed and synthesized by adjusting groups on the diazo component and the coupling component, and the alkali resistance and oxidation resistance of this kind of disperse dyes are improved; the alkali resistance, oxidation resistance and other dyeing properties of the synthetic disperse dyes are tested; a series of benzothiazole disperse dyes having gradient differences in alkali resistance and oxidation resistance are obtained by introducing different substituents, disperse dyes capable of meeting requirements of a one-bath process for cotton bleaching and disperse dyeing of a polyester-cotton blended fabric or a one-bath process for alkali deweighting and disperse dyeing of polyester fabrics are determined, and a reference is provided for structural design of disperse dyes with alkali resistance and oxidation resistance.

A first objective of the disclosure is to provide a method for preparing benzothiazole disperse dyes different in alkali resistance, a difference in alkali resistance is achieved by adjusting groups of a structural formula of the benzothiazole disperse dyes, and an alkali resistance sequence of the disperse dyes is obtained after different groups are introduced, wherein the structural formula of the benzothiazole disperse dyes is shown in Formula 1:

Formula 1

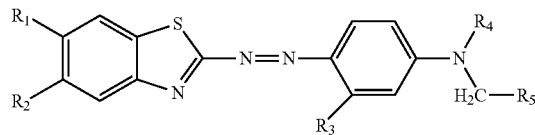

and in Formula 1, $R_1$ and $R_2$ are each independently hydrogen, chlorine or nitro; $R_3$, $R_4$ and $R_5$ are each independently hydrogen, linear or branched alkyl, hydroxyalkyl, cyanoalkyl, cyanoalkoxyalkyl, phenyl, benzyl, alkylphenyl or alkylbenzyl; alkyl groups involved are all C1-4 alkyl groups;

on the basis that $R_1$ and $R_2$ are each independently hydrogen, chlorine or nitro, $R_3$ is hydrogen or linear or branched alkyl and $R_4$ is linear or branched alkyl, hydroxyalkyl, cyanoalkyl, cyanoalkoxyalkyl, phenyl, benzyl, alkylphenyl or alkylbenzyl, the alkali resistance of a benzothiazole disperse dye obtained when $R_5$ is benzyl, phenyl, alkylphenyl or alkylbenzyl>the alkali resistance of a benzothiazole disperse dye obtained when $R_5$ is linear or branched alkyl>the alkali resistance of a benzothiazole disperse dye obtained when $R_5$ is cyanoalkyl, cyanoalkoxyalkyl or hydroxyalkyl.

In an embodiment of the disclosure, on the basis that $R_1$ and $R_2$ are each independently hydrogen, chlorine or nitro, $R_3$ is hydrogen, methyl or ethyl and $R_4$ is hydrogen, linear or branched alkyl, hydroxyalkyl, cyanoalkyl, cyanoalkoxyalkyl, phenyl, benzyl, alkylphenyl or alkylbenzyl, the alkali resistance of a benzothiazole disperse dye obtained when $R_5$ is benzyl, phenyl, alkylphenyl or alkylbenzyl>the alkali resistance of a benzothiazole disperse dye obtained when $R_5$ is linear or branched alkyl>the alkali resistance of a benzothiazole disperse dye obtained when $R_5$ is cyanoalkyl, cyanoalkoxyalkyl or hydroxyalkyl.

In an embodiment of the disclosure, on the basis that $R_1$ and $R_2$ are each independently H, Cl or $NO_2$, $R_3$ is H, $CH_3$ or $CH_2CH_3$ and $R_4$ is H, $CH_3$, $CH_2CH_3$, $CH_2CH_2CN$, $CH_2CH_2OCH_2CH_2CN$, $CH_2CH_2OH$,

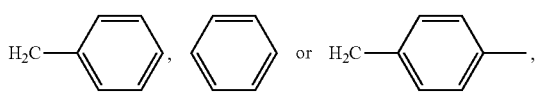

the alkali resistance of a benzothiazole disperse dye obtained when $R_5$ is

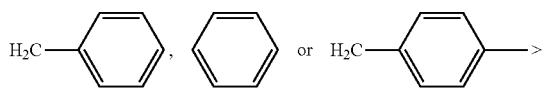

the alkali resistance of a benzothiazole disperse dye obtained when $R_5$ is $CH_2CH_3>$the alkali resistance of a benzothiazole disperse dye obtained when $R_5$ is $CH_2CH_2CN$, $CH_2CH_2OCH_2CH_2CN$ or $CH_2CH_2OH$.

In an embodiment of the disclosure, a synthetic method of a benzothiazole disperse dye includes the following steps:
(1) obtaining a diazo solution through a diazotization reaction;
(2) performing a coupling reaction: making the diazo solution and a coupling component undergo a reaction to obtain a product filter cake;
(3) performing purification: performing recrystallization to purify a dye.

In an embodiment of the disclosure, a synthetic method of a benzothiazole disperse dye includes the following steps:
(1) performing a diazo reaction: adding a diazo component into a single-neck flask, adding concentrated $H_2SO_4$, reducing the temperature to 0-5° C., adding nitrosyl sulfuric acid under stirring, performing uniform stirring and detection with a starch-potassium iodide test paper until the color is blue to ensure that nitrosyl sulfuric acid is excessive, performing a reaction continuously for 2-5 h, adding sulfamic acid to remove excessive nitrosyl sulfuric acid after the reaction is completed, and performing stirring for 15 min to obtain a diazo solution;
(2) performing a coupling reaction: adding water, $H_2SO_4$ and a coupling component into a double-neck flask, performing stirring, and reducing the temperature to 0-10° C. for a reaction to obtain a coupling solution; slowly adding the diazo solution obtained in step (1) dropwise into the coupling solution under stirring for performing a reaction continuously at 0-10° C. for 1-3 h, increasing the temperature to 0-15° C. for performing a reaction continuously for 4-5 h, and after the reaction is completed, adding sodium hydroxide to adjust the pH to neutral to obtain a product; performing suction filtration, washing and drying on the obtained product to obtain a filter cake;
(3) dissolving the filter cake obtained in step (2) in an ethanol solution, and performing reflux at 70° C. for 2 h, cooling, recrystallization, filtration and drying to obtain a benzothiazole disperse dye.

In an embodiment of the disclosure, a method for preparing benzothiazole disperse dyes different in alkali resistance includes adjusting a substituent to achieve a difference in alkali resistance, and the alkali resistance of a benzothiazole disperse dye obtained when the N substituent in the coupling component is p-methylbenzyl or benzyl>the alkali resistance of a benzothiazole disperse dye obtained when the N substituent in the coupling component is benzyl+cyano or benzyl+cyanoethoxyethyl>the alkali resistance of a benzothiazole disperse dye obtained when the N substituent in the coupling component is ethyl>the alkali resistance of a benzothiazole disperse dye obtained when the N substituent in the coupling component is cyanoethyl, cyanoethoxyethyl or hydroxyethyl.

In an embodiment of the disclosure, the diazo component in step (1) is one or more of 2-amino-5,6-dichlorobenzothiazole, 2-amino-6-chlorobenzothiazole, 2-amino-6-nitrobenzothiazole and 2-amino-benzothiazole.

In an embodiment of the disclosure, the coupling component in step (2) is one or more of N-ethyl-N-p-methylbenzylaniline, N-ethyl-N-p-methylbenzyl-m-toluidine, N-cyanoethyl-N-benzylaniline, N-cyanoethyl-N-benzyl-m-toluidine, N-ethyl-N-benzyl-m-toluidine, N-ethyl-N-benzylaniline, N,N-diethylaniline and N-ethyl-N-hydroxyethylaniline.

A second objective of the disclosure is to provide a method for preparing benzothiazole disperse dyes different in oxidation resistance when pH=10, a difference in oxidation resistance is achieved by adjusting groups of a structural formula of the benzothiazole disperse dyes, and an oxidation resistance sequence of the disperse dyes is obtained after groups are introduced, wherein the structural formula of the benzothiazole disperse dyes is shown in Formula 1:

Formula 1

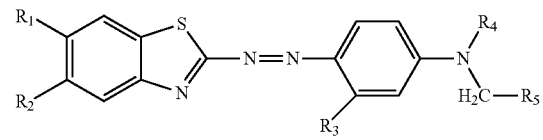

and in Formula 1, $R_1$ and $R_2$ are each independently hydrogen, chlorine or nitro; $R_3$, $R_4$ and $R_5$ are each independently linear or branched alkyl, hydroxyalkyl, cyanoalkyl, cyanoalkoxyalkyl, phenyl, benzyl, alkylphenyl or alkylbenzyl; alkyl groups involved are all C1-4 alkyl groups;

on the basis that $R_1$ and $R_2$ are each independently hydrogen, chlorine or nitro and $R_3$ and $R_4$ are each independently hydroxyalkyl, cyanoalkyl, cyanoalkoxyalkyl, phenyl, benzyl, alkylphenyl or alkylbenzyl, the oxidation resistance of a benzothiazole disperse dye obtained when $R_5$ is benzyl, phenyl, alkylphenyl or alkylbenzyl>the oxidation resistance of a benzothiazole disperse dye obtained when $R_5$ is linear or branched alkyl>the oxidation resistance of a benzothiazole disperse dye obtained when $R_5$ is cyanoalkyl, cyanoalkoxyalkyl or hydroxyalkyl.

In an embodiment of the disclosure, on the basis that $R_1$ and $R_2$ are each independently hydrogen, chlorine or nitro, $R_3$ is hydrogen, methyl or ethyl and $R_4$ is hydrogen, linear or branched alkyl, hydroxyalkyl, cyanoalkyl, cyanoalkoxyalkyl, phenyl, benzyl, alkylphenyl or alkylbenzyl, the oxidation resistance of a benzothiazole disperse dye obtained when $R_5$ is benzyl, phenyl, alkylphenyl or alkylbenzyl>the oxidation resistance that of a benzothiazole disperse dye obtained when $R_5$ is linear or branched alkyl>the oxidation resistance of a benzothiazole disperse dye obtained when $R_5$ is cyanoalkyl, cyanoalkoxyalkyl or hydroxyalkyl.

In an embodiment of the disclosure, on the basis that $R_1$ and $R_2$ are each independently H, Cl or $NO_2$, $R_3$ is H, $CH_3$ or $CH_2CH_3$ and $R_4$ is H, $CH_3$, $CH_2CH_3$, $CH_2CH_2CN$, $CH_2CH_2OCH_2CH_2CN$, $CH_2CH_2OH$,

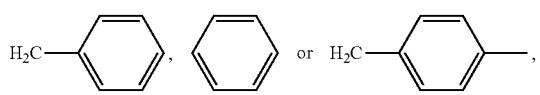

the oxidation resistance of a benzothiazole disperse dye obtained when $R_5$ is

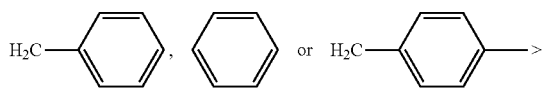

the oxidation resistance of a benzothiazole disperse dye obtained when $R_5$ is $CH_2CH_3$>the oxidation resistance of a benzothiazole disperse dye obtained when $R_5$ is $CH_2CH_2CN$, $CH_2CH_2OCH_2CH_2CN$ or $CH_2CH_2OH$.

In an embodiment of the disclosure, a synthetic method of a benzothiazole disperse dye includes the following steps:
(1) obtaining a diazo solution through a diazotization reaction;
(2) performing a coupling reaction: making the diazo solution and a coupling component undergo a reaction to obtain a product filter cake;
(3) performing purification: performing recrystallization to purify a dye.

In an embodiment of the disclosure, a synthetic method of a benzothiazole disperse dye includes the following steps:
(1) performing a diazo reaction: adding a diazo component into a single-neck flask, adding concentrated $H_2SO_4$, reducing the temperature to 0-5° C., adding nitrosyl sulfuric acid under stirring, performing uniform stirring and detection with a starch-potassium iodide test paper until the color is blue to ensure that nitrosyl sulfuric acid is excessive, performing a reaction continuously for 2-5 h, adding sulfamic acid to remove excessive nitrosyl sulfuric acid after the reaction is completed, and performing stirring for 15 min to obtain a diazo solution;
(2) performing a coupling reaction: adding water, $H_2SO_4$ and a coupling component into a double-neck flask, performing stirring, and reducing the temperature to 0-10° C. for a reaction to obtain a coupling solution; slowly adding the diazo solution obtained in step (1) dropwise into the coupling solution under stirring for performing a reaction continuously at 0-10° C. for 1-3 h, increasing the temperature to 0-15° C. for performing a reaction continuously for 4-5 h, and after the reaction is completed, adding sodium hydroxide to adjust the pH to neutral to obtain a product; performing suction filtration, washing and drying on the obtained product to obtain a filter cake;
(3) dissolving the filter cake obtained in step (2) in an ethanol solution, and performing reflux at 70° C. for 2 h, cooling, recrystallization, filtration and drying to obtain a benzothiazole disperse dye.

In an embodiment of the disclosure, a method for preparing benzothiazole disperse dyes different in oxidation resistance includes adjusting a substituent to achieve a difference in oxidation resistance, and the oxidation resistance of a benzothiazole disperse dye obtained when the N substituent in the coupling component is p-methylbenzyl, benzyl, ethyl, benzyl+cyano or benzyl+cyanoethoxyethyl>the oxidation resistance of a benzothiazole disperse dye obtained when the N substituent in the coupling component is cyanoethyl, cyanoethoxyethyl or hydroxyethyl.

In an embodiment of the disclosure, the diazo component in step (1) is one or more of 2-amino-5,6-dichlorobenzothiazole, 2-amino-6-chlorobenzothiazole, 2-amino-6-nitrobenzothiazole and 2-amino-benzothiazole.

In an embodiment of the disclosure, the coupling component in step (2) is one or more of N-ethyl-N-p-methylbenzylaniline, N-ethyl-N-p-methylbenzyl-m-toluidine, N-cyanoethyl-N-benzylaniline, N-cyanoethyl-N-benzyl-m-toluidine, N-ethyl-N-benzyl-m-toluidine, N-ethyl-N-benzylaniline, N,N-diethylaniline and N-ethyl-N-hydroxyethylaniline.

A third objective of the disclosure is to provide a benzothiazole disperse dye with a structural formula shown in Formula 2, Formula 2

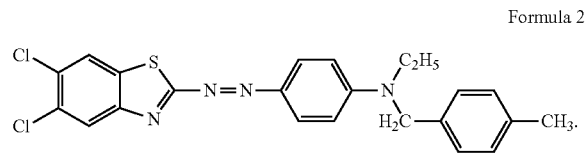 [SMILES: CCN(Cc1ccc(C)cc1)c1ccc(N=Nc2nc3cc(Cl)c(Cl)cc3s2)cc1]

A fourth objective of the disclosure is to provide a benzothiazole disperse dye with a structural formula shown in Formula 3, Formula 3

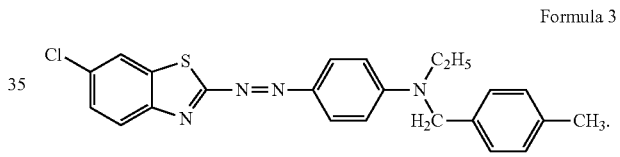

A fifth objective of the disclosure is to provide a benzothiazole disperse dye with a structural formula shown in Formula 4, Formula 4

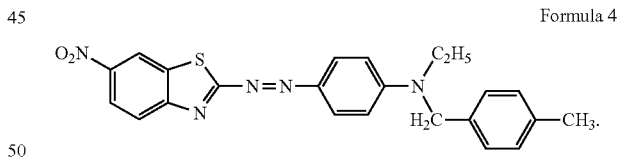

A sixth objective of the disclosure is to provide a benzothiazole disperse dye with a structural formula shown in Formula 5, Formula 5

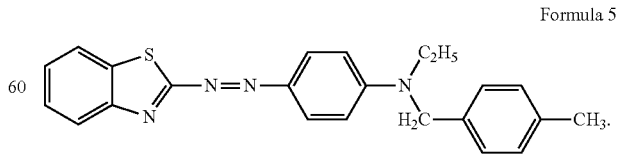

A seventh objective of the disclosure is to provide a benzothiazole disperse dye with a structural formula shown in Formula 6,

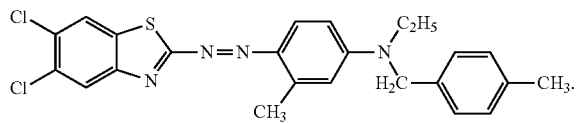

Formula 6

An eighth objective of the disclosure is to provide a benzothiazole disperse dye with a structural formula shown in Formula 7,

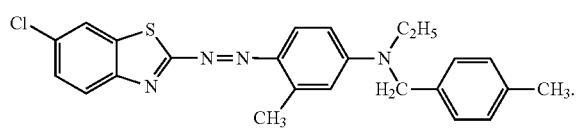

Formula 7

A ninth objective of the disclosure is to provide a benzothiazole disperse dye with a structural formula shown in Formula 8,

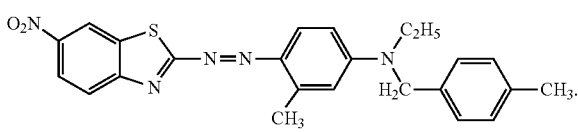

Formula 8

A tenth objective of the disclosure is to provide a benzothiazole disperse dye with a structural formula shown in Formula 9,

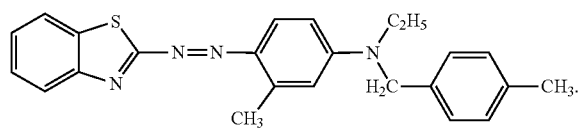

Formula 9

An eleventh objective of the disclosure is to provide a benzothiazole disperse dye with a structural formula shown in Formula 10,

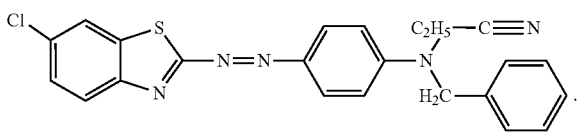

Formula 10

A twelfth objective of the disclosure is to provide a benzothiazole disperse dye with a structural formula shown in Formula 11,

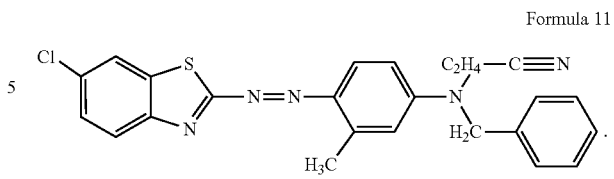

Formula 11

A thirteenth objective of the disclosure is to provide a benzothiazole disperse dye with a structural formula shown in Formula 12,

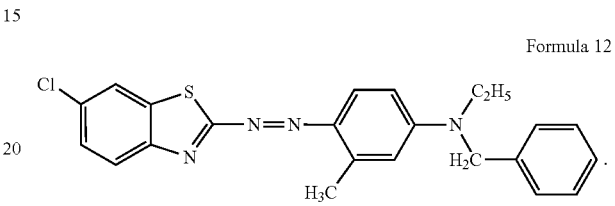

Formula 12

A fourteenth objective of the disclosure is to provide a benzothiazole disperse dye with a structural formula shown in Formula 13,

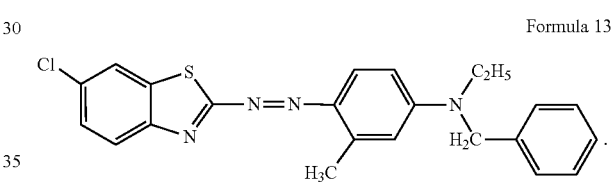

Formula 13

A fifteenth objective of the disclosure is to provide a benzothiazole disperse dye with a structural formula shown in Formula 14,

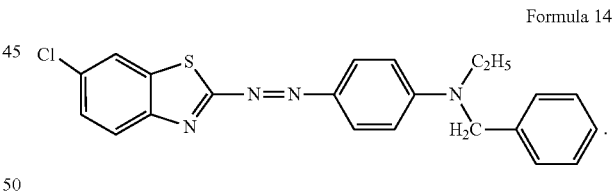

Formula 14

A sixteenth objective of the disclosure is to provide a benzothiazole disperse dye with a structural formula shown in Formula 15,

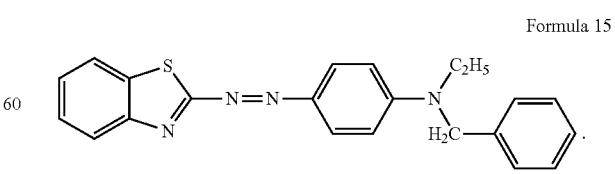

Formula 15

A seventeenth objective of the disclosure is to provide a benzothiazole disperse dye with a structural formula shown in Formula 16,

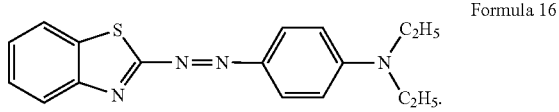

Formula 16

An eighteenth objective of the disclosure is to provide a benzothiazole disperse dye with a structural formula shown in Formula 17,

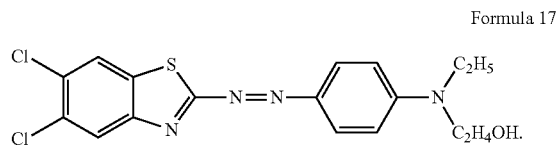

Formula 17

A nineteenth objective of the disclosure is to provide a benzothiazole disperse dye with a structural formula shown in Formula 18,

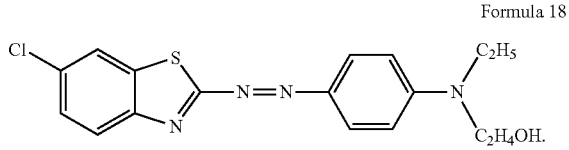

Formula 18

A twentieth objective of the disclosure is to provide a benzothiazole disperse dye with a structural formula shown in Formula 19,

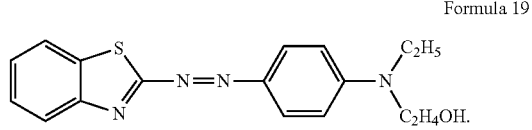

Formula 19

A twenty-first objective of the disclosure is to provide application of a benzothiazole disperse dye in a one-bath process for cotton bleaching and disperse dyeing of a polyester-cotton blended fabric or a one-bath process for alkali deweighting and disperse dyeing of polyester fabrics.

In an embodiment of the disclosure, application of a benzothiazole disperse dye in the one-bath process for cotton bleaching and disperse dyeing of a polyester-cotton blended fabric or the one-bath process for alkali deweighting and disperse dyeing of polyester fabrics specifically includes:

(1) preparing dyeing solutions at room temperature, wherein in the one-bath process for cotton bleaching and disperse dyeing of a polyester-cotton blended fabric, the use amount of the dye in the dyeing solution is 0.2-2% (weight to the fabric) of the weight of a polyester-cotton blended fabric, the pH of the dyeing solution is 10-11, the use amount of an alkali-resistant levelling agent in the dyeing solution is 0.5-2 g/L, hydrogen peroxide is 5-10 g/L, and a hydrogen peroxide stabilizer is 2 g/L; in the one-bath process for alkali deweighting and dyeing of polyester fabrics, the use amount of the dye in the dyeing solution is 0.2-2% of the weight of a polyester knitted fabric, the use amount of an alkali-resistant levelling agent is 0.5-2 g/L, the use amount of sodium hydroxide is 0-10 g/L, and the weight ratio of the dyeing solution to the fabric is 5-30:1;

(2) adding the polyester-cotton blended fabric or the polyester knitted fabric into the corresponding dyeing solution prepared in step (1), and obtaining a dyed polyester-cotton blended fabric or polyester knitted fabric by using a high-temperature and high-pressure dyeing method;

(3) performing reduction clearing on the dyed polyester-cotton blended fabric or polyester knitted fabric to obtain a polyester-cotton blended fabric dyed by using the one-bath process for cotton bleaching and disperse dyeing and a polyester knitted fabric dyed by using the one-bath process for alkali deweighting and disperse dyeing.

A twenty-second objective of the disclosure is to provide a method for evaluating the alkali resistance of a benzothiazole disperse dye based on groups of a structural formula of the benzothiazole disperse dye, wherein the structural formula of the benzothiazole disperse dye is shown in Formula 1:

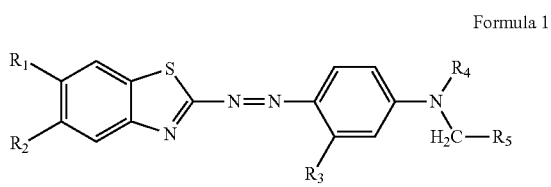

Formula 1 and in Formula 1, $R_1$ and $R_2$ are each independently hydrogen, chlorine or nitro; $R_3$, $R_4$ and $R_5$ are each independently hydrogen, linear or branched alkyl, hydroxyalkyl, cyanoalkyl, cyanoalkoxyalkyl, phenyl, benzyl, alkylphenyl or alkylbenzyl; alkyl groups involved are all C1-4 alkyl groups;

on the basis that $R_1$ and $R_2$ are each independently hydrogen, chlorine or nitro, $R_3$ is hydrogen or linear or branched alkyl and $R_4$ is linear or branched alkyl, hydroxyalkyl, cyanoalkyl, cyanoalkoxyalkyl, phenyl, benzyl, alkylphenyl or alkylbenzyl, the alkali resistance of a benzothiazole disperse dye obtained when $R_5$ is benzyl, phenyl, alkylphenyl or alkylbenzyl>the alkali resistance of a benzothiazole disperse dye obtained when $R_5$ is linear or branched alkyl>the alkali resistance of a benzothiazole disperse dye obtained when $R_5$ is cyanoalkyl, cyanoalkoxyalkyl or hydroxyalkyl.

A twenty-third objective of the disclosure is to provide a method for evaluating the oxidation resistance of a benzothiazole disperse dye based on groups of a structural formula of the benzothiazole disperse dye when the pH=10, wherein the structural formula of the benzothiazole disperse dye is shown in Formula 1:

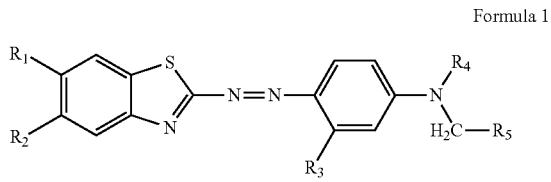

Formula 1 and in Formula 1, $R_1$ and $R_2$ are each independently hydrogen, chlorine or nitro; $R_3$, $R_4$ and $R_5$ are each independently hydrogen, linear or branched alkyl, hydroxyalkyl, cyanoalkyl, cyanoalkoxyalkyl, phenyl, benzyl, alkylphenyl or alkylbenzyl; alkyl groups involved are all C1-4 alkyl groups;

on the basis that $R_1$ and $R_2$ are each independently hydrogen, chlorine or nitro and $R_3$ and $R_4$ are each independently hydroxyalkyl, cyanoalkyl, cyanoalkoxyalkyl, phenyl, benzyl, alkylphenyl or alkylbenzyl, the oxidation resistance of a benzothiazole disperse dye obtained when $R_5$ is benzyl, phenyl, alkylphenyl or alkylbenzyl>the oxidation resistance of a benzothiazole disperse dye obtained when $R_5$ is linear or branched alkyl>the oxidation resistance of a benzothiazole disperse dye obtained when $R_5$ is cyanoalkyl, cyanoalkoxyalkyl or hydroxyalkyl.

Beneficial effects of the disclosure:

(1) Benzothiazole heterocyclic azo disperse dyes designed and synthesized in the disclosure have high brightness, bright color, stable luster and other spectral properties.

(2) In the disclosure, azo alkali-resistant disperse dyes with benzothiazole and derivatives as the diazo component are synthesized based on structural design of the dyes, the alkali resistance and oxygen bleaching resistance of the heterocyclic azo disperse dyes are improved by introducing different groups to the coupling component, a series of benzothiazole disperse dyes having gradient differences in alkali resistance and oxidation resistance are obtained, disperse dyes capable of meeting requirements of a one-bath process for cotton bleaching and disperse dyeing of a polyester-cotton blended fabric or a one-bath process for alkali deweighting and disperse dyeing of polyester fabrics are determined, and a reference is provided for structural design of disperse dyes with alkali resistance and oxidation resistance.

(3) In the disclosure, an alkali resistance sequence of synthetic benzothiazole disperse dyes after different substituents are introduced is determined based on the alkali resistance stability of this kind of disperse dyes, i.e., the alkali resistance of a benzothiazole disperse dye obtained when the N substituent in the coupling component is p-methylbenzyl or benzyl>the alkali resistance of a benzothiazole disperse dye obtained when the N substituent in the coupling component is benzyl+ cyano or benzyl+cyanoethoxyethyl>the alkali resistance of a benzothiazole disperse dye obtained when the N substituent in the coupling component is ethyl>the alkali resistance of a benzothiazole disperse dye obtained when the N substituent in the coupling component is cyanoethyl, cyanoethoxyethyl or hydroxyethyl.

(4) In the disclosure, an oxidation resistance sequence of synthetic benzothiazole disperse dyes after different substituents are introduced is determined based on the oxidation resistance of this kind of disperse dyes, i.e., the oxidation resistance of a benzothiazole disperse dye obtained when the N substituent in the coupling component is p-methylbenzyl, benzyl, ethyl, benzyl+cyano or benzyl+cyanoethoxyethyl>the oxidation resistance of a benzothiazole disperse dye obtained when the N substituent in the coupling component is cyanoethyl, cyanoethoxyethyl or hydroxyethyl.

(5) According to the method for improving the alkali resistance and oxidation resistance of benzothiazole disperse dyes provided in the disclosure, disperse dyes with excellent alkali resistance and oxidation resistance can be obtained, and requirements of the one-bath process for cotton bleaching and disperse dyeing of a polyester-cotton blended fabric for the disperse dyes can be met; at the same time, disperse dyes with high alkali resistance are also obtained, and requirements of the one-bath process for alkali deweighting and disperse dyeing of polyester fabrics for the disperse dyes can be met.

(6) According to the method of the disclosure, a polyester-cotton dyeing and finishing process flow is simplified, requirements of energy saving and emission reduction in the textile industry are met, and good social and economic benefits can be obtained.

DETAILED DESCRIPTION

Figure 1:
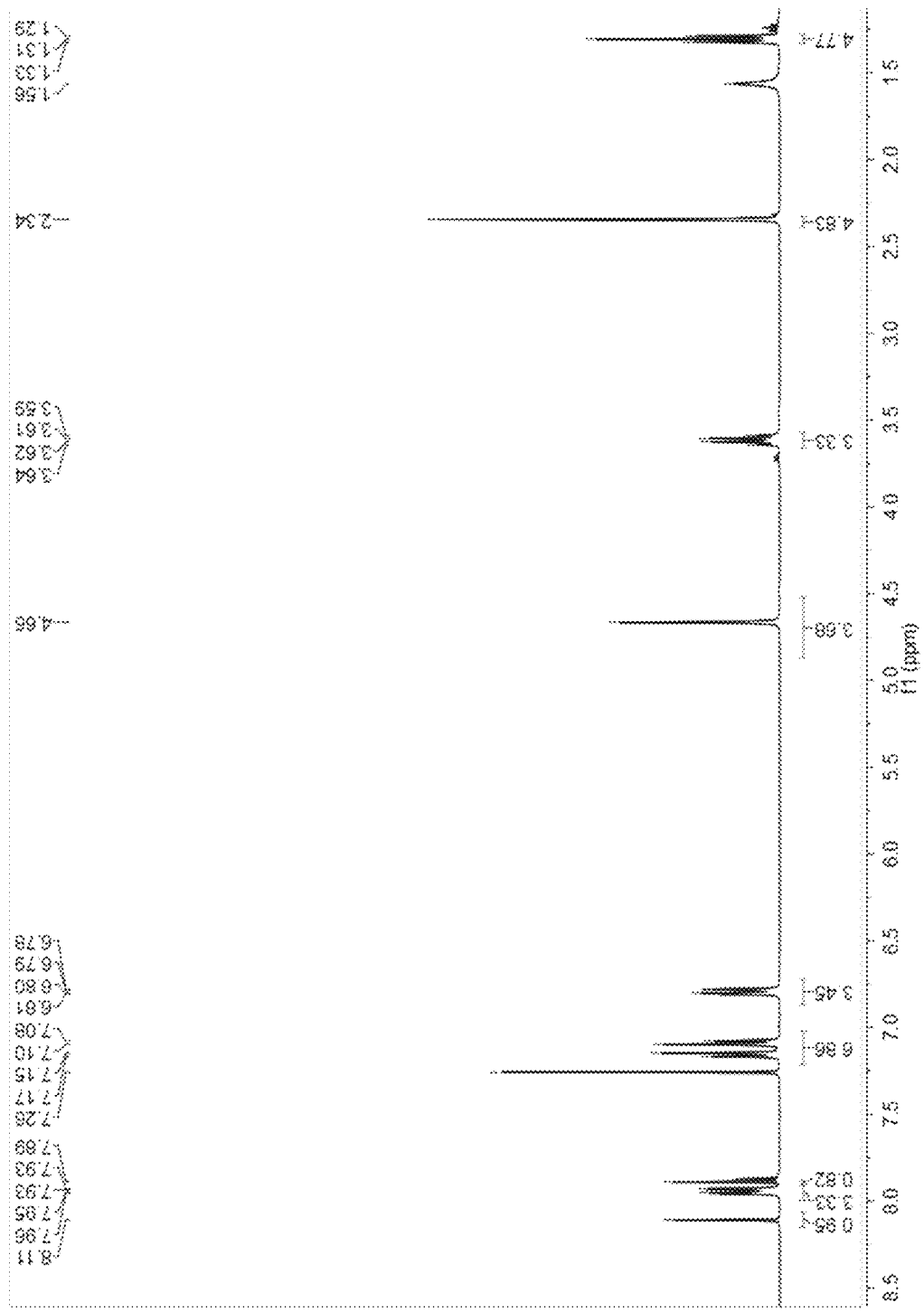
FIG. 1 is a hydrogen nuclear magnetic resonance spectrum of a benzothiazole disperse dye obtained in Example 1.

It should be understood that descriptions of the following preferred examples of the disclosure are used to better explain the disclosure, but not intended to limit the disclosure.

Performance Test Methods

An alkali resistance test of a dye including a stability test under different pH values and a stability test under different NaOH concentrations and an oxidation resistance test of the dye are involved. Specific test steps include:

(1) preparing a dyeing solution at room temperature, wherein the use amount of a dye in the dyeing solution is 2% of the weight of a polyester knitted fabric, the use amount of an alkali-resistant levelling agent is 1 g/L, the weight ratio of the dyeing solution to the polyester knitted fabric is 30:1, a high-temperature and high-pressure dyeing method is used, and reduction clearing is performed on the polyester knitted fabric after dyeing to obtain a dyed polyester knitted fabric;

(2) testing the stability of a dye under different pH values, wherein a dye bath with a pH=3-13 is prepared, dyeing and reduction clearing after dyeing are performed on a polyester knitted fabric under different pH values according to a dyeing and reduction clearing process formula and a process flow in step (1), the stability of the dye under different pH values is tested, and the highest pH value when the color and luster of the dye are not changed is taken as the highest pH resistant value of the dye;

(3) testing the stability of a dye under different NaOH concentrations, wherein a test on high alkali resistance of a benzothiazole disperse dye is performed when the pH is stable and ≥10, a dye bath with a NaOH concentration of 0-10 g/L is prepared, dyeing and reduction clearing after dyeing are performed on a polyester knitted fabric under different NaOH concentrations according to a dyeing and reduction clearing process formula and a process flow in step (1), the stability of the dye under different NaOH concentrations is tested, and the highest NaOH concentration when the color and luster of the dye are not changed is taken as the highest NaOH resistant concentration of the dye;

(4) testing the stability of a dye under different hydrogen peroxide concentrations, wherein since the optimal pH value of hydrogen peroxide for bleaching a cotton fabric is 10-11, the stability of the dye under different hydrogen peroxide concentrations is tested when the pH is 10, a dye bath with a hydrogen peroxide concentration of 0-5 g/L is prepared, dyeing and reduction clearing after dyeing are performed on a polyester knitted fabric under different hydrogen peroxide concentrations according to a dyeing and reduction clearing process formula and a process flow in step (1) under the condition that the concentration of a hydrogen peroxide stabilizer (stabilizer DM1403) is 2 g/L, the stability of the dye under different hydrogen peroxide concentrations is tested, and the highest hydrogen peroxide concentration when the color and luster of the dye are not changed is taken as the highest hydrogen peroxide resistant concentration of the dye.

Example 1

A benzothiazole disperse dye with a structural formula shown below is provided,

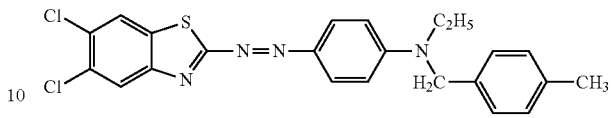

A synthetic route is:

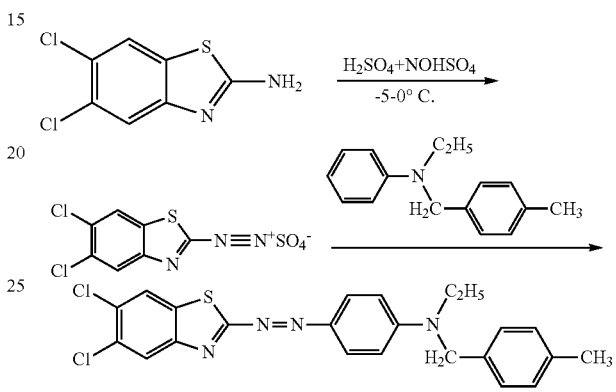

A preparation method of the benzothiazole disperse dye includes the following steps:

(1) performing a diazo reaction: adding 2-amino-5,6-dichlorobenzothiazole (0.04 mol) into a single-neck flask, adding 20.00 ml of water and 15.6 g of a 98% sulfuric acid solution, reducing the temperature to 0° C., adding an appropriate amount (12.7 g) of nitrosyl sulfuric acid under stirring (300-500 rpm), performing uniform stirring and detection with a starch-potassium iodide test paper until the color is blue to ensure that nitrosyl sulfuric acid is excessive, performing a reaction continuously for 3 h, adding 3.88 g of sulfamic acid to remove excessive nitrosyl sulfuric acid after the reaction is completed, and performing stirring at 0° C. for 15 min to obtain a diazo solution;

(2) performing a coupling reaction: adding 60 mL of water, 2 mL of $H_2SO_4$ and a coupling component (N-ethyl-N-p-methylphenylaniline (0.1 mol)) into a double-neck flask, and reducing the temperature to 8° C. to obtain a coupling solution; slowly adding the diazo solution obtained in step (1) dropwise into the coupling solution under stirring for performing a reaction continuously at 8° C. for 2 h, increasing the temperature to 12° C. for performing a reaction continuously for 4 h, and after the reaction is completed, adding sodium hydroxide to adjust the pH to neutral to obtain a product; performing suction filtration, washing and drying on the obtained product to obtain a filter cake;

(3) dissolving the filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results (FIG. 1) of hydrogen nuclear magnetic resonance spectrum are:

$^1$H NMR (400 MHz, CDCl$_3$) δ 8.11 (s, 1H, Ar—H, 1), 7.96-7.93 (dd, 2H, Ar—H, 3, 3'), 7.89 (s, 1H, Ar—H, 2), 7.26 (solvent peak), 7.17-7.08 (dd, 4H, Ar—H, 8, 9, 10, 11), 6.81-6.78 (dd, 2H, Ar—H, 4, 4'), 4.66 (s, 2H, —CH$_2$—, 7), 3.64-3.59 (q, 2H, —CH$_2$—, 5), 2.34 (s, 3H, —CH$_3$, 12), 1.56 (water peak), 1.33-1.29 (t, 3H, —CH$_3$, 6).

Example 2

A benzothiazole disperse dye with a structural formula shown below is provided,

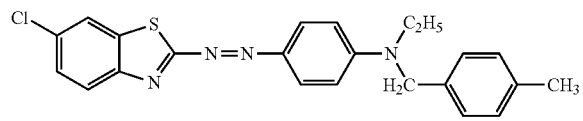 [SMILES: CCN(Cc1ccc(C)cc1)c1ccc(N=Nc2nc3ccc(Cl)cc3s2)cc1]

A synthetic route is:

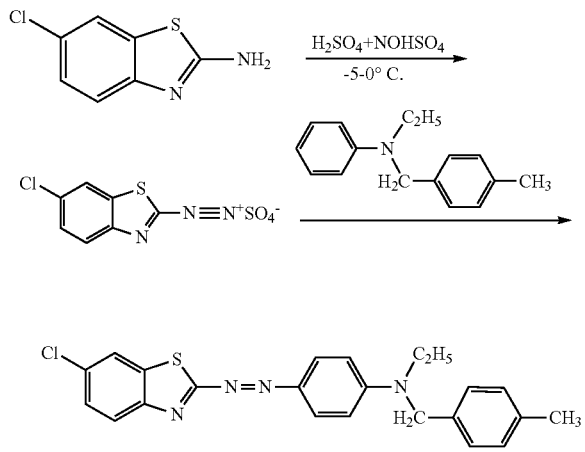

A preparation method of the benzothiazole disperse dye includes the following steps:

(1) performing a diazo reaction, wherein "2-amino-5,6-dichlorobenzothiazole" in step (1) in Example 1 was changed into "2-amino-6-chlorobenzothiazole", and other conditions were the same as those in step (1) in Example 1;

(2) performing a coupling reaction, wherein conditions were the same as those in step (2) in Example 1;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 2:
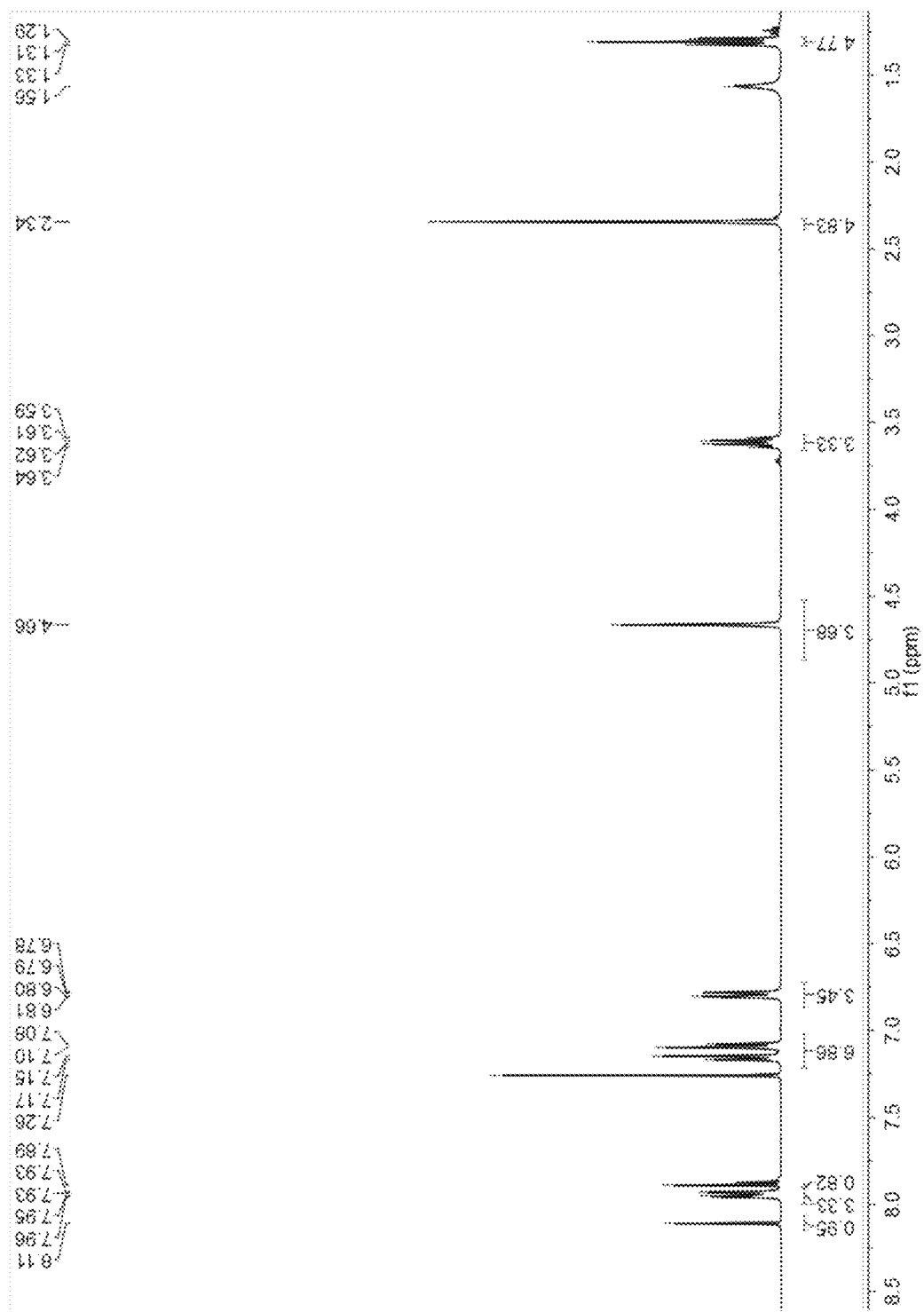
FIG. 2 is a hydrogen nuclear magnetic resonance spectrum of a benzothiazole disperse dye obtained in Example 2.

Structural characterization is performed on the obtained benzothiazole disperse dye, and results (FIG. 2) of hydrogen nuclear magnetic resonance spectrum are:

$^1$H NMR (400 MHz, CDCl$_3$) δ 8.11 (s, 1H, Ar—H, 1), 7.96-7.93 (dd, 2H, Ar—H, 3, 3'), 7.89 (s, 1H, Ar—H, 2), 7.26 (solvent peak), 7.17-7.08 (dd, 4H, Ar—H, 8, 9, 10, 11), 6.81-6.78 (dd, 2H, Ar—H, 4, 4'), 4.66 (s, 2H, —CH$_2$—, 7), 3.64-3.59 (q, 2H, —CH$_2$—, 5), 2.34 (s, 3H, —CH$_3$, 12), 1.56 (water peak), 1.33-1.29 (t, 3H, —CH$_3$, 6).

Example 3

A benzothiazole disperse dye with a structural formula shown below is provided,

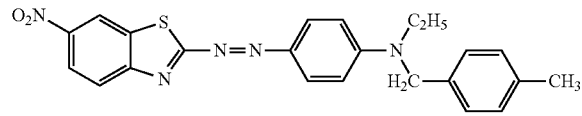 [SMILES: CCN(Cc1ccc(C)cc1)c1ccc(N=Nc2nc3ccc([N+](=O)[O-])cc3s2)cc1]

A synthetic route is:

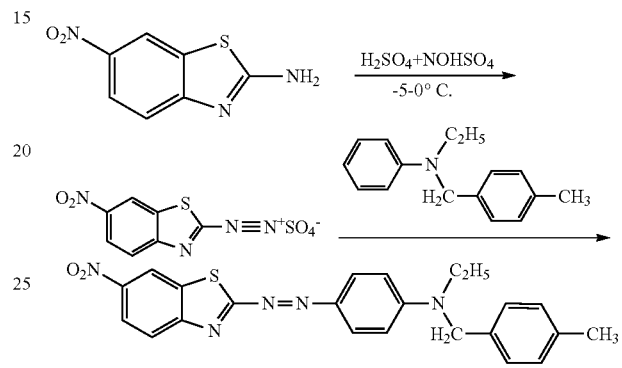

A preparation method of the benzothiazole disperse dye includes the following steps:

(1) performing a diazo reaction, wherein "2-amino-5,6-dichlorobenzothiazole" in step (1) in Example 1 was changed into "2-amino-6-nitrobenzothiazole", and other conditions were the same as those in step (1) in Example 1;

(2) performing a coupling reaction, wherein conditions were the same as those in step (2) in Example 1;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 3:
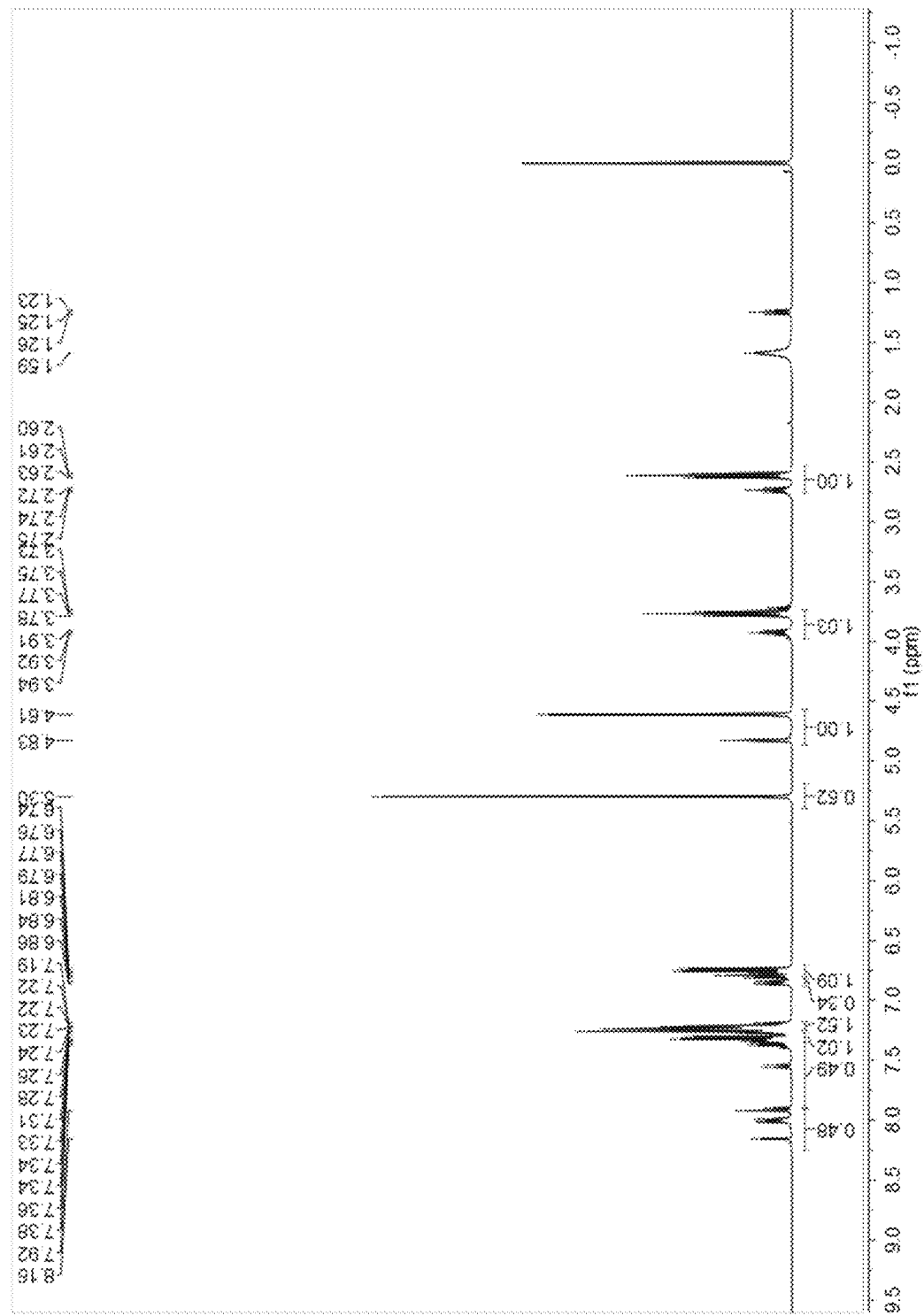
FIG. 3 is a hydrogen nuclear magnetic resonance spectrum of a benzothiazole disperse dye obtained in Example 3.

Structural characterization is performed on the obtained benzothiazole disperse dye, and results (FIG. 3) of hydrogen nuclear magnetic resonance spectrum are:

$^1$H NMR (500 MHz, CDCl$_3$) δ 8.08-7.99 (d, 1H, Ar—H, 1), 7.96-7.85 (d, 1H, Ar—H, 2) 7.85-7.49 (dd, 1H, Ar—H, 3), 7.26 (solvent peak), 7.17-7.07 (dd, 4H, Ar—H, 10, 11, 12, 13), 6.65-6.62 (dd, 1H, Ar—H, 4), 6.61-6.60 (t, 1H, Ar—H, 5), 4.65 (s, 2H, —CH$_2$—, 9), 3.61-3.56 (s, 2H, —CH$_2$—, 7), 2.66-2.63 (d, 3H, —CH$_3$, 6), 2.35 (s, 3H, —CH$_3$, 14), 1.57 (water peak), 1.31-1.28 (t, 3H, —CH$_3$, 8).

Example 4

A benzothiazole disperse dye with a structural formula shown below is provided,

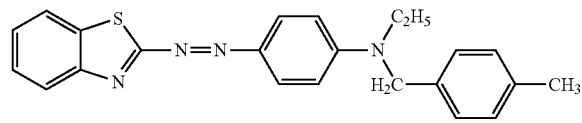 [SMILES: CCN(Cc1ccc(C)cc1)c1ccc(N=Nc2nc3ccccc3s2)cc1]

A synthetic route is:

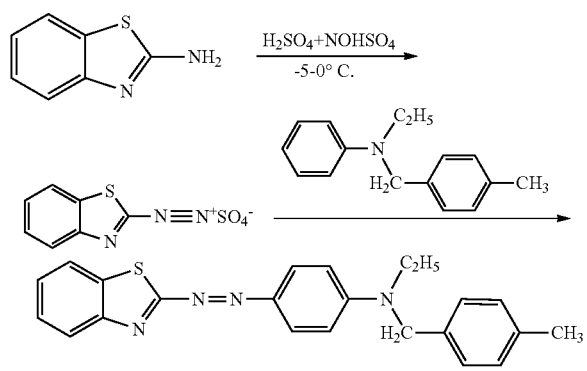

A preparation method of the benzothiazole disperse dye includes the following steps:
(1) performing a diazo reaction, wherein "2-amino-5,6-dichlorobenzothiazole" in step (1) in Example 1 was changed into "2-aminobenzothiazole", and other conditions were the same as those in step (1) in Example 1;
(2) performing a coupling reaction, wherein conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 4:
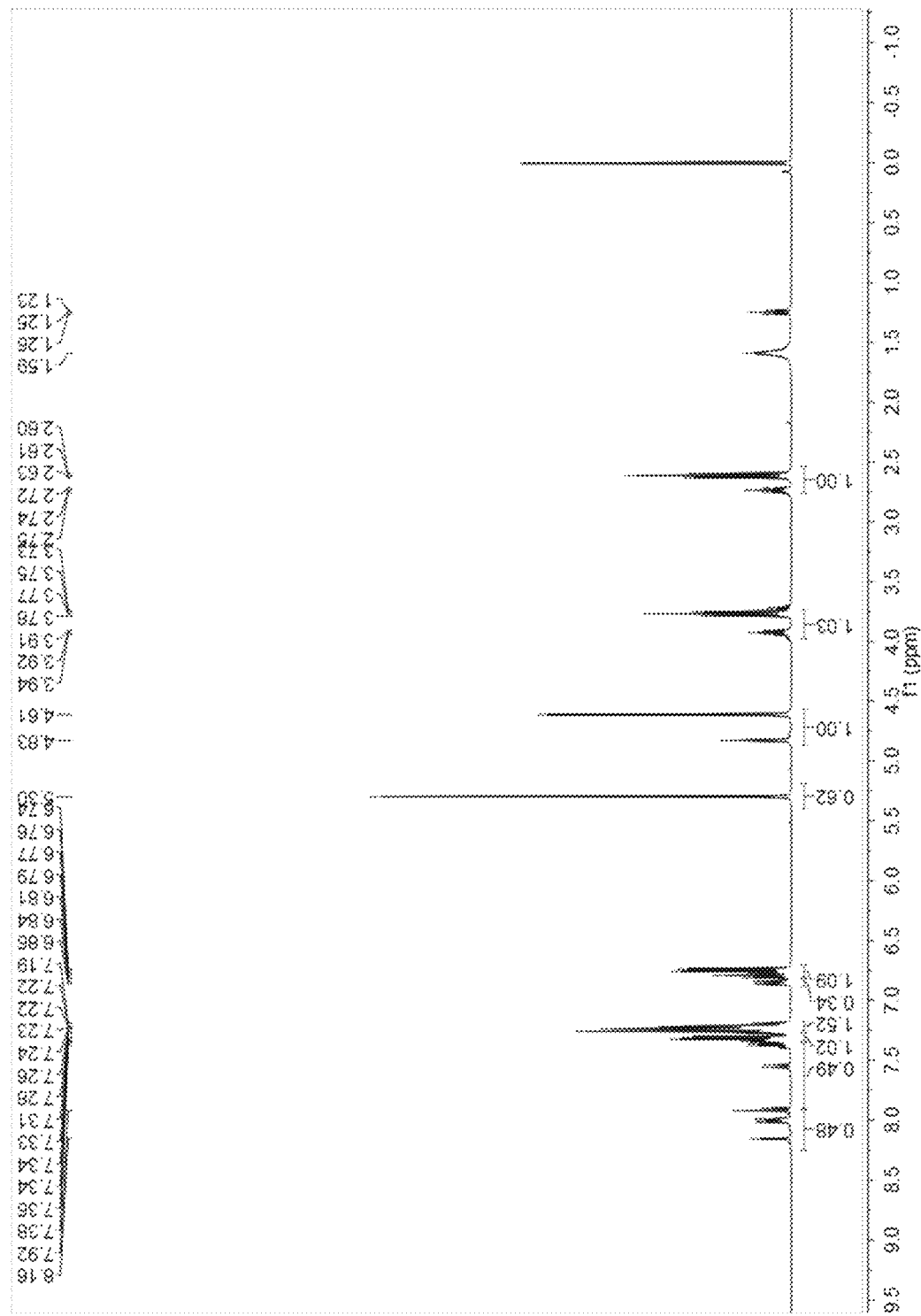
FIG. 4 is a hydrogen nuclear magnetic resonance spectrum of a benzothiazole disperse dye obtained in Example 4.

Structural characterization is performed on the obtained benzothiazole disperse dye, and results (FIG. 4) of hydrogen nuclear magnetic resonance spectrum are:

$^1$H NMR (400 MHz, CDCl$_3$) δ 8.14, 7.89 (d, 1H, Ar—H, 2), 8.00-7.97 (d, 1H, Ar—H, 3), 7.90, 7.88, 7.55, 7.53 (dd, 1H, Ar—H, 1), 7.39-7.32 (m, 3H, Ar—H, 10, 12, 14), 7.26 (solvent peak), 7.20-7.18 (d, 2H, Ar—H, 11, 13), 6.69-6.67 (d, 1H, Ar—H, 4), 6.67-6.65 (d, 1H, Ar—H, 5), 4.81 (s, 2H, —CH$_2$—, 9), 3.91-3.88 (t, 2H, —CH$_2$—, 7), 2.76-2.72 (m, 2H, —CH$_2$—, 8), 2.70-2.68 (d, 3H, —CH$_3$, 6), 1.56 (water peak).

Example 5

A benzothiazole disperse dye with a structural formula shown below is provided,

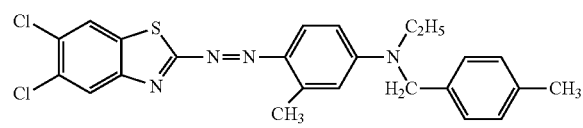

A synthetic route is:

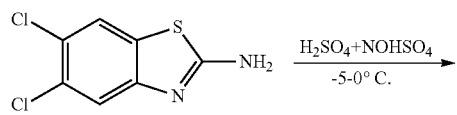

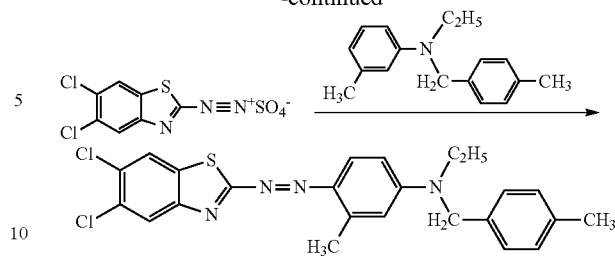

A preparation method of the benzothiazole disperse dye includes the following steps:
(1) performing a diazo reaction, wherein conditions were the same as those in step (1) in Example 1;
(2) performing a coupling reaction, wherein "N-ethyl-N-p-methylphenylaniline" in step (2) in Example 1 was changed into "N-ethyl-N-p-methylphenyl-m-methylaniline", and other conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 5:
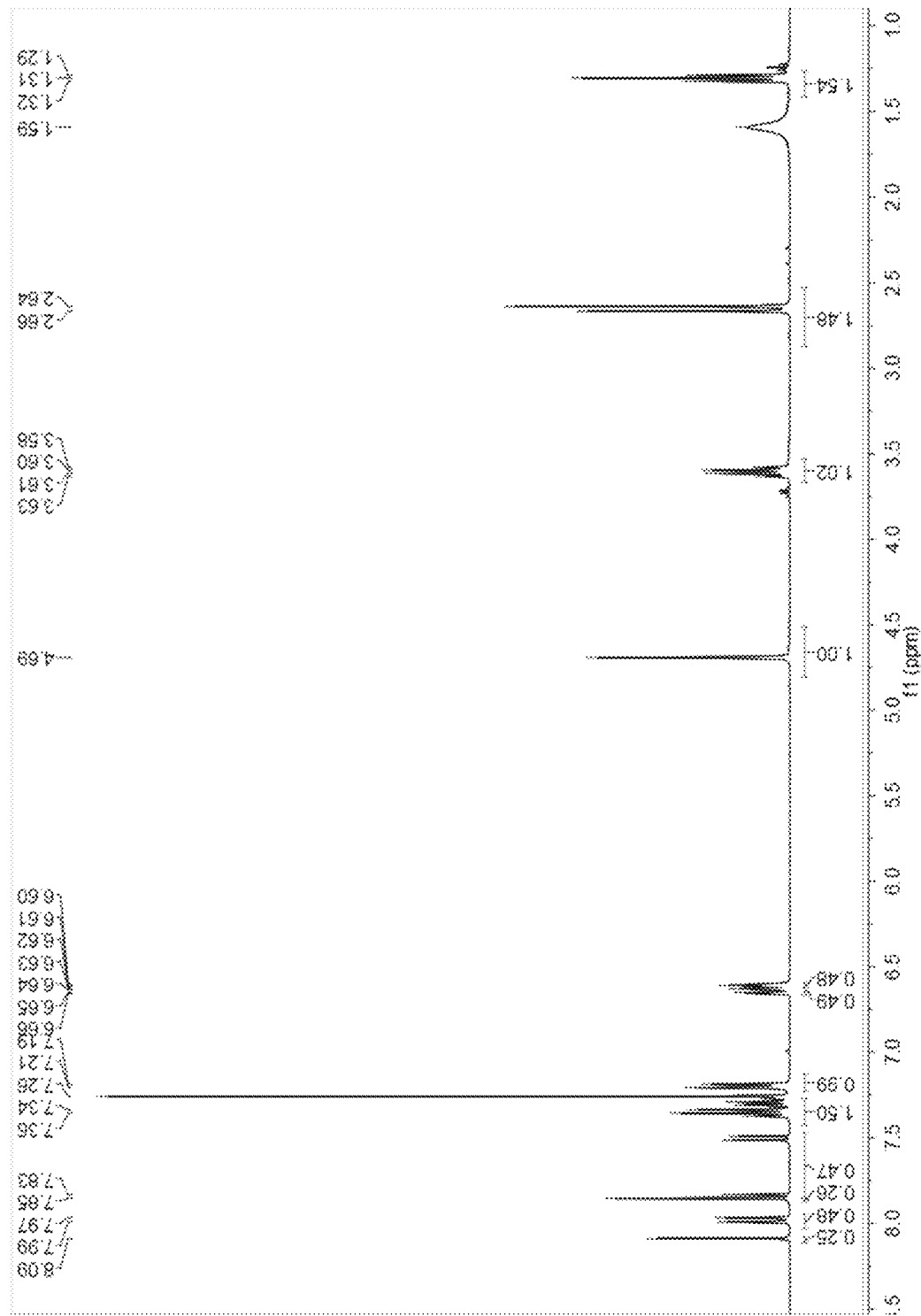
FIG. 5 is a hydrogen nuclear magnetic resonance spectrum of a benzothiazole disperse dye obtained in Example 5.

Structural characterization is performed on the obtained benzothiazole disperse dye, and results (FIG. 5) of hydrogen nuclear magnetic resonance spectrum are:

$^1$H NMR (400 MHz, CDCl$_3$) δ 8.09, 7.85 (d, H, Ar—H, 2), 7.99-7.97 (d, 1H, Ar—H, 3), 7.83-7.49 (dd, 1H, Ar—H, 1), 7.37-7.26 (m, 3H, Ar—H, 10, 14, 12), 7.26 (solvent peak), 7.21-7.19 (d, 2H, Ar—H, 11, 13), 6.66-6.63 (dd, 1H, Ar—H, 4), 6.62-6.60 (t, 1H, Ar—H, 5), 4.69 (s, 2H, —CH$_2$—, 9), 3.63-3.58 (q, 2H, —CH$_2$—, 7), 2.66-2.64 (d, 3H, —CH$_3$, 6), 1.59 (water peak), 1.32-1.29 (t, 3H, —CH$_3$, 8).

Example 6

A benzothiazole disperse dye with a structural formula shown below is provided,

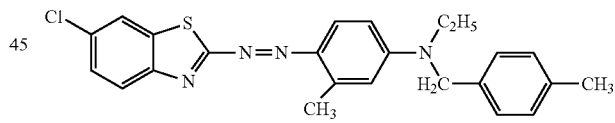

A synthetic route is:

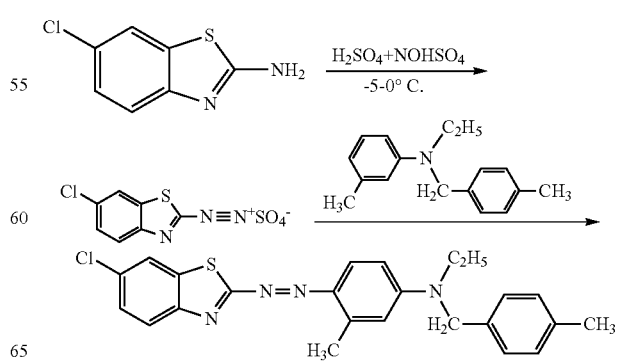

A preparation method of the benzothiazole disperse dye includes the following steps:

(1) performing a diazo reaction, wherein conditions were the same as those in step (1) in Example 2;

(2) performing a coupling reaction, wherein conditions were the same as those in step (2) in Example 5;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 6:
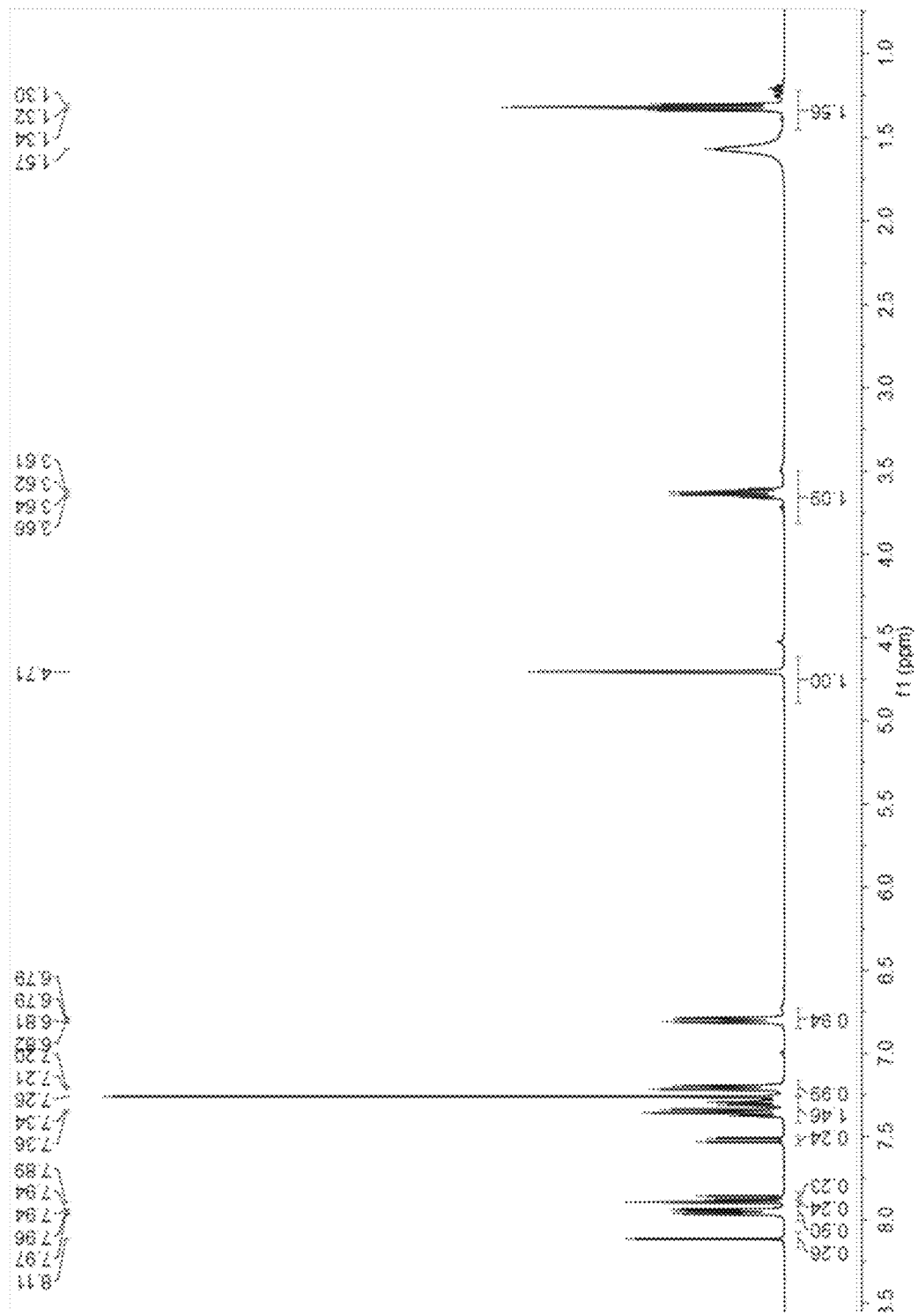
FIG. 6 is a hydrogen nuclear magnetic resonance spectrum of a benzothiazole disperse dye obtained in Example 6.

Structural characterization is performed on the obtained benzothiazole disperse dye, and results (FIG. 6) of hydrogen nuclear magnetic resonance spectrum are:

hydrogen spectrum: $^1$H NMR (400 MHz, CDCl$_3$) δ 8.11, 7.89 (d, 1H, Ar—H, 2), 7.97-7.94 (dd, 2H, Ar—H, 3, 3'), 7.88-7.51 (dd, 1H, Ar—H, 1), 7.38-7.29 (m, 3H, Ar—H, 8, 10, 12), 7.26 (solvent peak), 7.21-7.20 (d, 2H, Ar—H, 9, 11), 6.82-6.79 (dd, 2H, Ar—H, 4, 4'), 4.71 (s, 2H, —CH$_2$—, 7), 3.63 (q, 2H, —CH$_2$—, 5), 1.57 (water peak), 1.32 (t, 3H, —CH$_3$, 6).

Example 7

A benzothiazole disperse dye with a structural formula shown below is provided,

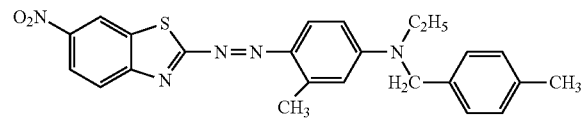

A synthetic route is:

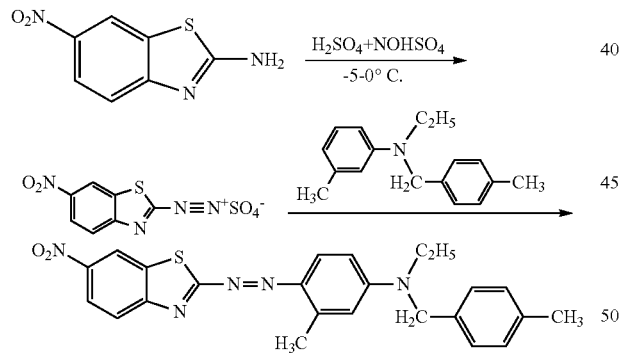

A preparation method of the benzothiazole disperse dye includes the following steps:

(1) performing a diazo reaction, wherein conditions were the same as those in step (1) in Example 3;

(2) performing a coupling reaction, wherein conditions were the same as those in step (2) in Example 5;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 7:
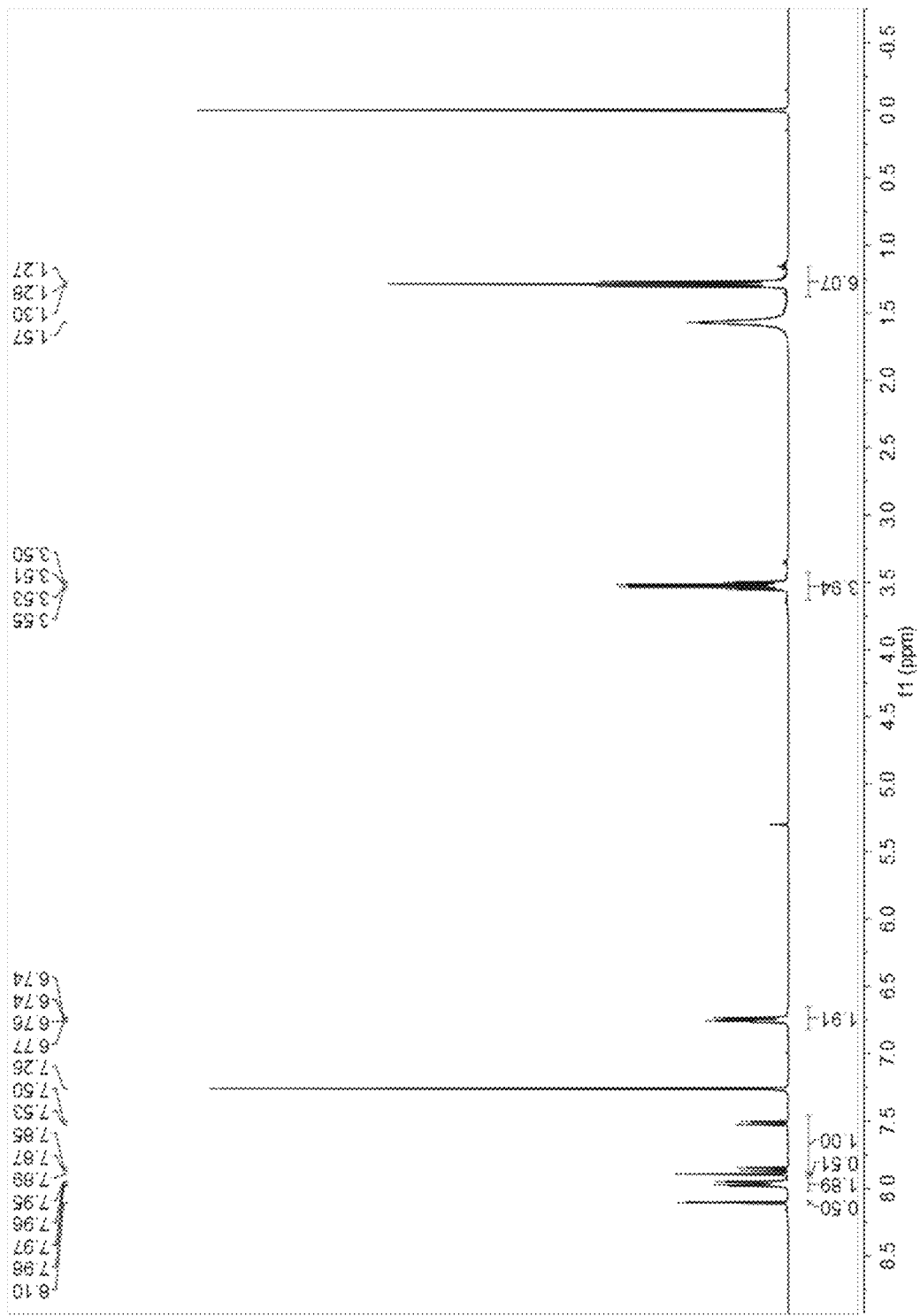
FIG. 7 is a hydrogen nuclear magnetic resonance spectrum of a benzothiazole disperse dye obtained in Example 7.

Structural characterization is performed on the obtained benzothiazole disperse dye, and results (FIG. 7) of hydrogen nuclear magnetic resonance spectrum are:

hydrogen spectrum: $^1$H NMR (400 MHz, CDCl$_3$) δ 8.10, 7.89 (d, 1H, Ar—H, 2), 7.98-7.95 (dd, 2H, Ar—H, 3, 3'), 7.87-7.50 (dd, 1H, Ar—H, 1), 7.26 (solvent peak), 6.77-6.74 (dd, 2H, Ar—H, 4, 4'), 3.55-3.50 (q, 4H, —CH$_2$—, 5, 5'), 1.57 (water peak), 1.30-1.27 (t, 6H, —CH$_3$, 6, 6')

Example 8

A benzothiazole disperse dye with a structural formula shown below is provided,

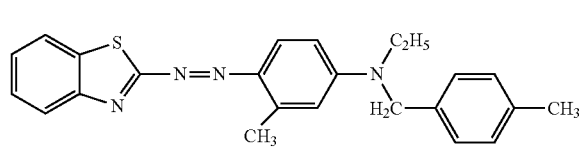

A synthetic route is:

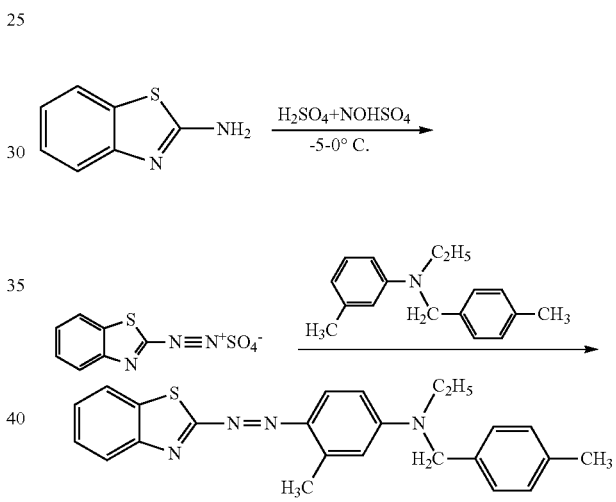

A preparation method of the benzothiazole disperse dye includes the following steps:

(1) performing a diazo reaction, wherein conditions were the same as those in step (1) in Example 4;

(2) performing a coupling reaction, wherein conditions were the same as those in step (2) in Example 5;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 8:
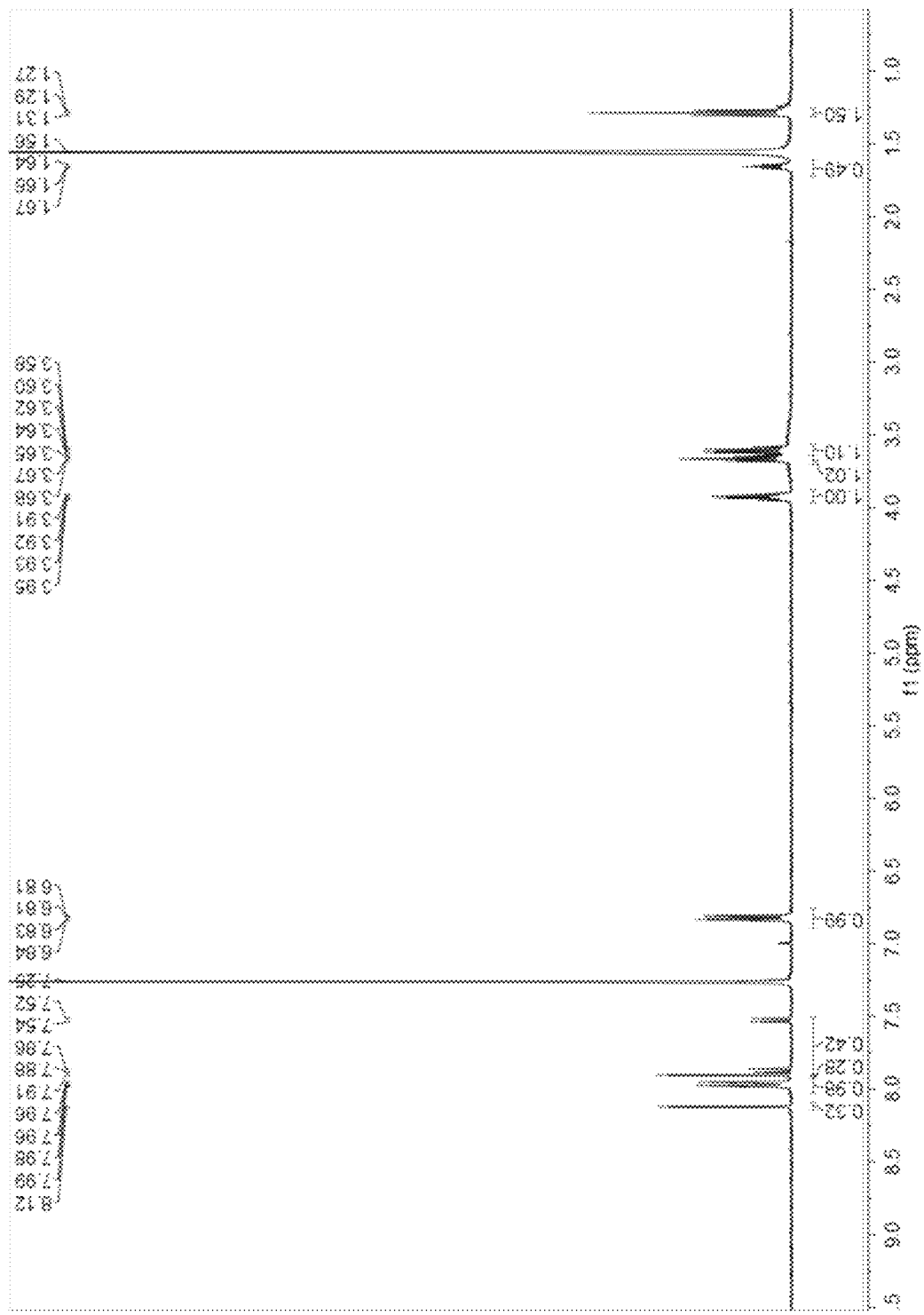
FIG. 8 is a hydrogen nuclear magnetic resonance spectrum of a benzothiazole disperse dye obtained in Example 8.

Structural characterization is performed on the obtained benzothiazole disperse dye, and results (FIG. 8) of hydrogen nuclear magnetic resonance spectrum are:

$^1$H NMR (400 MHz, CDCl$_3$) δ 8.12, 7.91 (d, 1H, Ar—H, 2), 7.99-7.96 (dd, 2H, Ar—H, 3, 3'), 7.88-7.52 (dd, 1H, Ar—H, 1), 7.26 (solvent peak), 6.84-6.81 (dd, 2H, Ar—H, 4, 4'), 3.95-3.91 (q, 2H, —CH$_2$—, 7), 3.68-3.65 (t, 2H, —CH$_2$—, 8), 3.64-3.58 (q, 2H, —CH$_2$—, 5), 1.67-1.64 (t, 1H, —OH, 9), 1.56 (water peak), 1.31-1.27 (t, 3H, —CH$_3$, 6).

Example 9

A benzothiazole disperse dye with a structural formula shown below is provided,

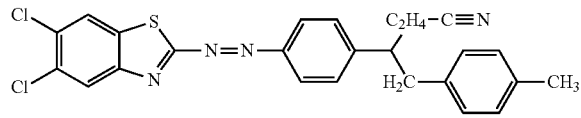

A synthetic route is:

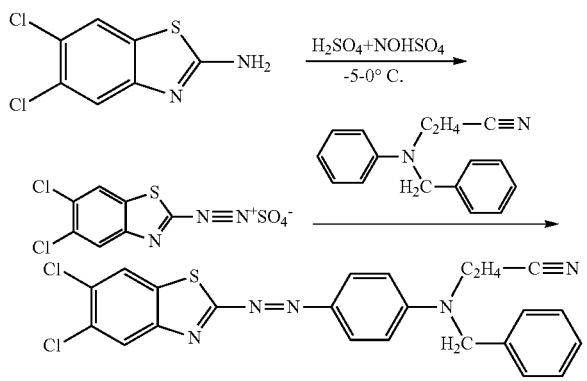

A preparation method of the benzothiazole disperse dye includes the following steps:
(1) performing a diazo reaction, wherein conditions were the same as those in step (1) in Example 1;
(2) performing a coupling reaction, wherein "N-ethyl-N-p-methylphenylaniline" in step (2) in Example 1 was changed into "N-propylcyano-N-phenylaniline", and other conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:
$^1$H NMR (400 MHz, CDCl$_3$) δ 7.97 (s, 1H, Ar—H, 1), 7.96-7.95 (d, 2H, Ar—H, 4, 4'), 7.80 (d, 1H, Ar—H, 2), 7.42-7.40 (dd, 1H, Ar—H, 3), 7.26 (solvent peak), 7.17-7.08 (dd, 4H, Ar—H, 9, 10, 11, 12), 6.79 (d, 2H, Ar—H, 5, 5'), 4.66 (s, 2H, —CH$_2$—, 8), 3.61 (q, 2H, —CH$_2$—, 6), 2.34 (s, 3H, —CH$_3$, 13), 1.55 (water peak), 1.30 (t, 3H, —CH$_3$, 7).

Example 10

A benzothiazole disperse dye with a structural formula shown below is provided,

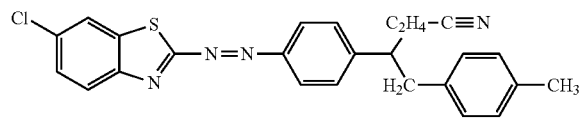

A synthetic route is:

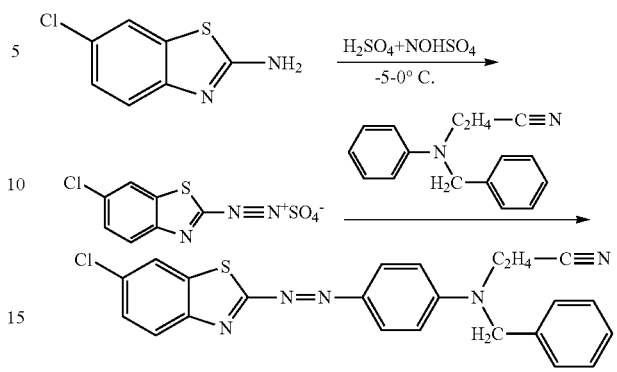

A preparation method of the benzothiazole disperse dye includes the following steps:
(1) performing a diazo reaction, wherein conditions were the same as those in step (1) in Example 2;
(2) performing a coupling reaction, wherein conditions were the same as those in step (2) in Example 9;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 9:
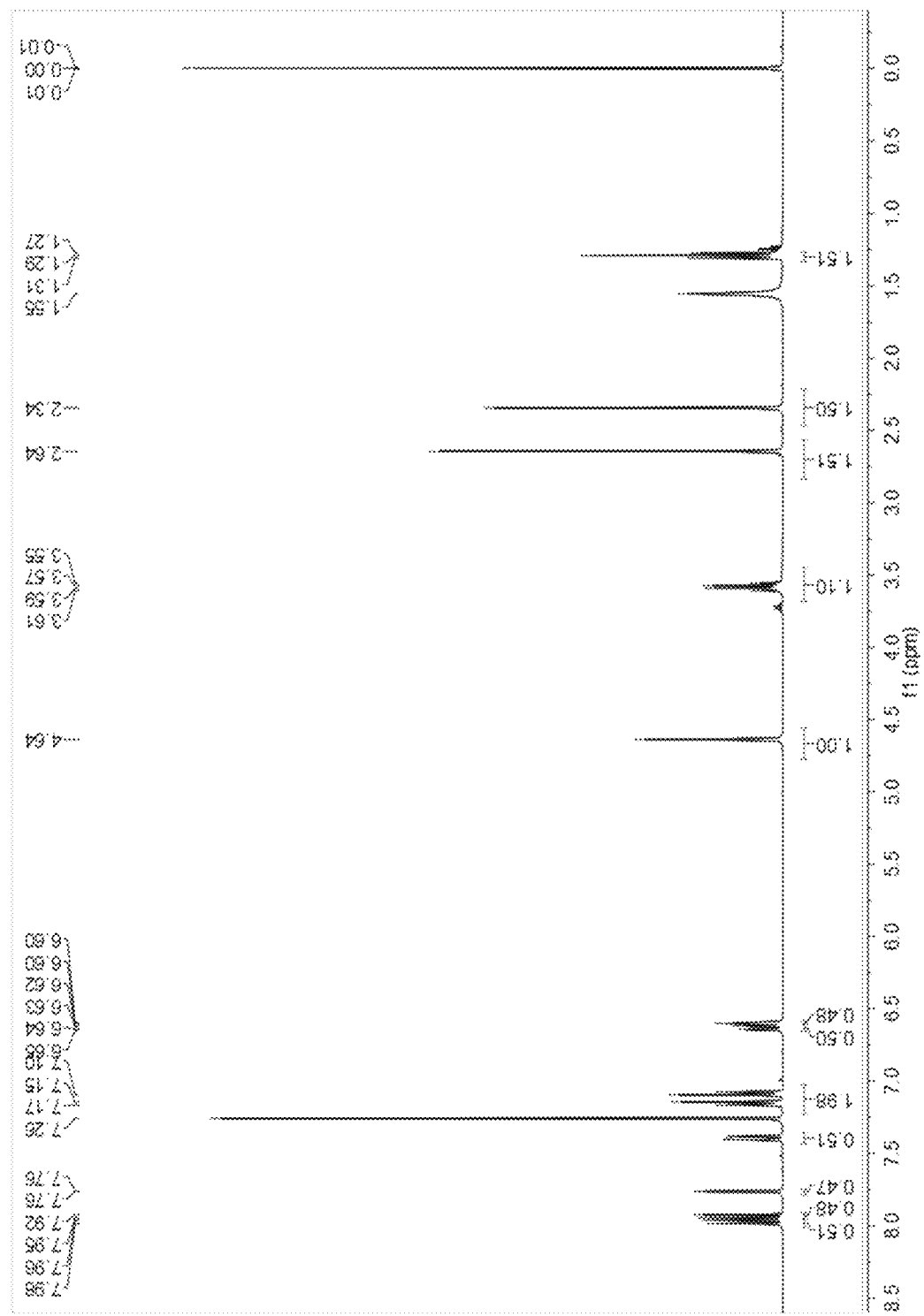
FIG. 9 is a hydrogen nuclear magnetic resonance spectrum of a benzothiazole disperse dye obtained in Example 10.

Structural characterization is performed on the obtained benzothiazole disperse dye, and results (FIG. 9) of hydrogen nuclear magnetic resonance spectrum are:
$^1$H NMR (400 MHz, CDCl$_3$) δ 7.98-7.96 (d, 1H, Ar—H, 1), 7.95-7.92 (d, 1H, Ar—H, 4), 7.76 (d, 1H, Ar—H, 2), 7.41-7.38 (dd, 1H, Ar—H, 3), 7.26 (solvent peak), 7.17-7.08 (dd, 4H, Ar—H, 11, 12, 13, 14), 6.65-6.62 (dd, 1H, Ar—H, 5), 6.60 (d, 1H, Ar—H, 6), 4.64 (s, 2H, —CH$_2$—, 10), 3.61-3.55 (q, 2H, —CH$_2$—, 8), 2.64 (s, 3H, —CH$_3$, 7), 2.34 (s, 3H, —CH$_3$, 15), 1.55 (water peak), 1.31-1.27 (t, 3H, —CH$_3$, 9)

Example 11

A benzothiazole disperse dye with a structural formula shown below is provided,

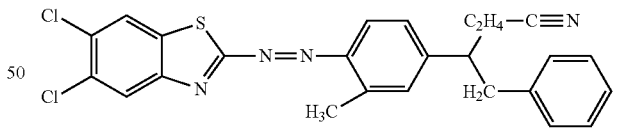

A synthetic route is:

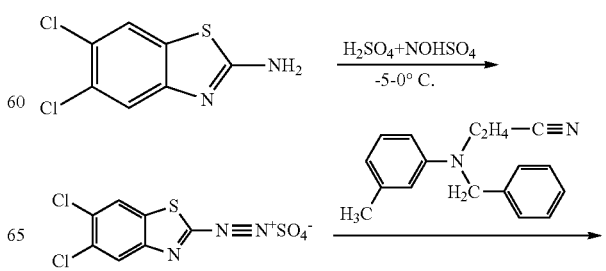

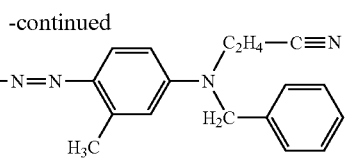

A preparation method of the benzothiazole disperse dye includes the following steps:

(1) performing a diazo reaction, wherein conditions were the same as those in step (1) in Example 1;
(2) performing a coupling reaction, wherein "N-ethyl-N-p-methylphenylaniline" in step (2) in Example 1 was changed into "N-propylcyano-N-phenyl-m-toluidine", and other conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.01-7.82 (dd, 1H, Ar—H, 1), 7.46-7.35 (dd, 1H, Ar—H, 3), 7.34-7.28, 7.24-7.19 (m, 7H, Ar—H, 4,4',9, 10, 11, 12, 13), 7.26 (solvent peak), 6.86-6.79 (dd, 1H, Ar—H, 2), 6.77-6.74 (t, 2H, Ar—H, 5, 5'), 4.61 (s, 2H, —CH$_2$—, 8), 3.78-3.75 (t, 2H, —CH$_2$—, 6), 3.75-3.70 (q, ethanol-CH$_2$—), 2.63-2.60 (t, 2H, —CH$_2$—, 7), 1.60 (water peak), 1.26-1.23 (t, ethanol-CH$_3$)

Example 12

A benzothiazole disperse dye with a structural formula shown below is provided,

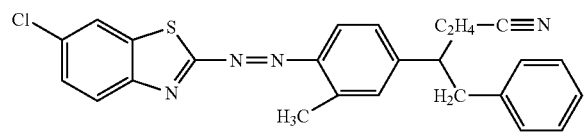

A synthetic route is:

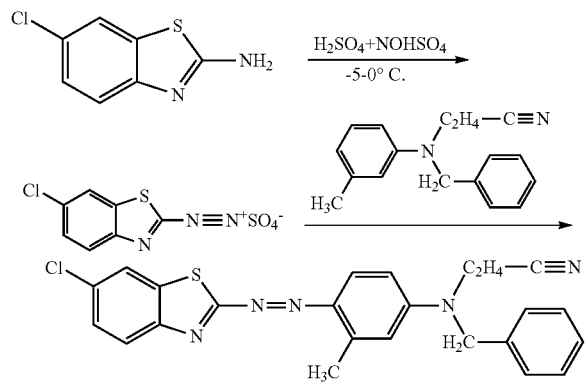

A preparation method of the benzothiazole disperse dye includes the following steps:

(1) performing a diazo reaction, wherein conditions were the same as those in step (1) in Example 10;
(2) performing a coupling reaction, wherein conditions were the same as those in step (2) in Example 11;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 10:
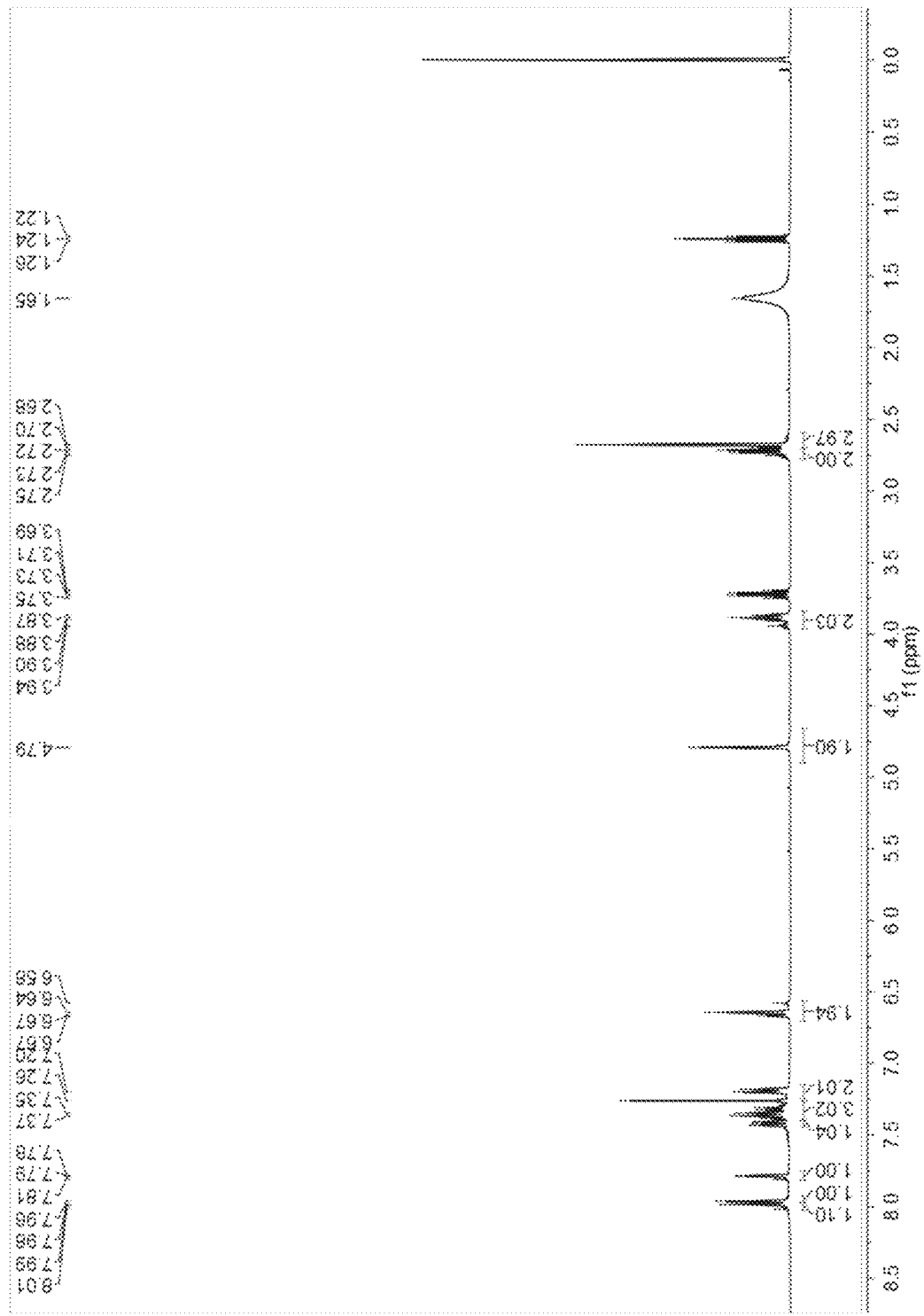
FIG. 10 is a hydrogen nuclear magnetic resonance spectrum of a benzothiazole disperse dye obtained in Example 12.

Structural characterization is performed on the obtained benzothiazole disperse dye, and results (FIG. 10) of hydrogen nuclear magnetic resonance spectrum are:

$^1$H NMR (400 MHz, CDCl$_3$) δ 8.01-7.89 (d, 1H, Ar—H, 1), 7.96 (s, 1H, Ar—H, 4), 7.81-7.78 (dd, 1H, Ar—H, 2), 7.43-7.41 (dd, 1H, Ar—H, 3), 7.38-7.31, 7.20-7.18 (m, 5H, Ar—H, 11, 12, 13, 14, 15), 7.26 (solvent peak), 6.67-6.58 (m, 2H, Ar—H, 5, 6), 4.79 (s, 2H, —CH$_2$—, 10), 3.94-3.87 (dt, 2H, —CH$_2$—, 8), 3.75-3.69 (q, ethanol-CH$_2$—), 2.75-2.72 (t, 2H, —CH$_2$—, 9), 2.70-2.68 (ds, 3H, —CH$_3$, 7), 1.65 (water peak), 1.26-1.22 (t, ethanol-CH$_3$)

Example 13

A benzothiazole disperse dye with a structural formula shown below is provided,

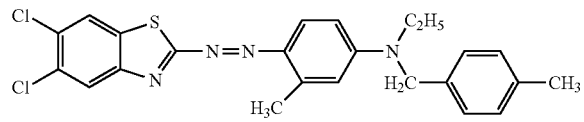 [SMILES: CCN(Cc1ccc(C)cc1)c1ccc(N=Nc2nc3cc(Cl)c(Cl)cc3s2)c(C)c1]

A synthetic route is:

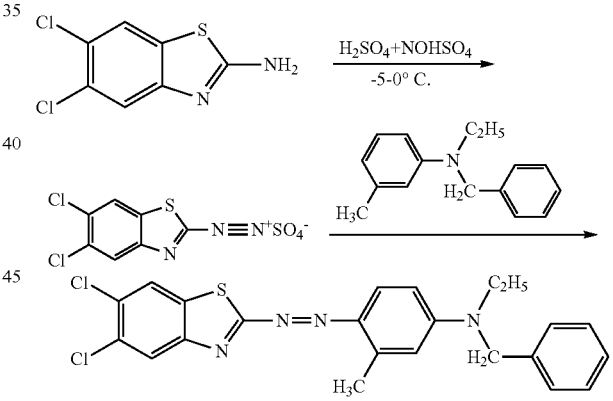

A preparation method of the benzothiazole disperse dye includes the following steps:

(1) performing a diazo reaction, wherein conditions were the same as those in step (1) in Example 1;
(2) performing a coupling reaction, wherein "N-ethyl-N-p-methylphenylaniline" in step (2) in Example 1 was changed into "N-ethyl-N-benzyl-m-toluidine", and other conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 7.98-7.92 (dd, 2H, Ar—H, 1, 4,), 7.76-7.75 (d, 1H, Ar—H, 2), 7.40-7.38 (dd, 1H, Ar—H, 3), 7.37-7.28, 7.21-7.19 (m, 5H, Ar—H, 11, 12, 13, 14, 15), 7.26 (solvent peak), 6.65-6.62 (dd, 1H, Ar—H, 5), 6.60-6.59 (d, 1H, Ar—H, 6), 4.67 (s, 2H, —CH$_2$—, 10), 3.62-3.56 (q, 2H, —CH$_2$—, 8), 2.64 (s, 3H, —CH$_3$, 7), 1.64 (water peak), 1.31-1.24 (t, 3H, —CH$_3$, 9).

Example 14

A benzothiazole disperse dye with a structural formula shown below is provided,

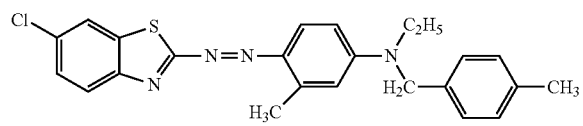 [SMILES: CCN(Cc1ccc(C)cc1)c1ccc(N=Nc2nc3ccc(Cl)cc3s2)c(C)c1]

A synthetic route is:

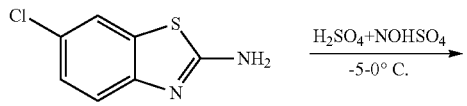

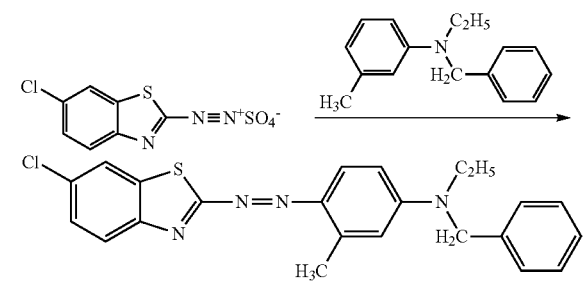

A preparation method of the benzothiazole disperse dye includes the following steps:

(1) performing a diazo reaction, wherein conditions were the same as those in step (1) in Example 2;

(2) performing a coupling reaction, wherein conditions were the same as those in step (2) in Example 13;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 11:
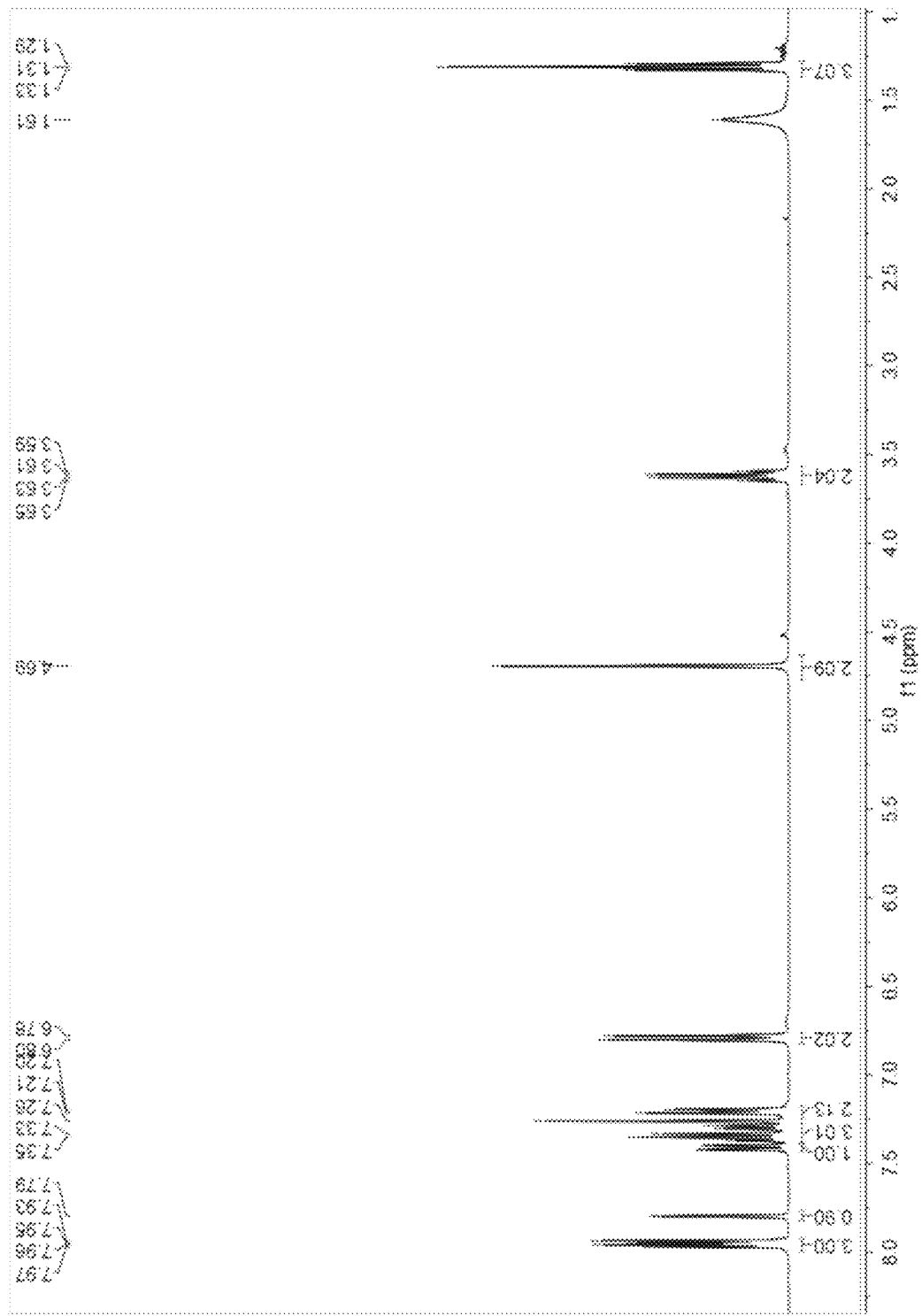
FIG. 11 is a hydrogen nuclear magnetic resonance spectrum of a benzothiazole disperse dye obtained in Example 14.

Structural characterization is performed on the obtained benzothiazole disperse dye, and results (FIG. 11) of hydrogen nuclear magnetic resonance spectrum are:

hydrogen spectrum: $^1$H NMR (400 MHz, CDCl$_3$) δ 7.97-7.93 (m, 3H, Ar—H, 1, 4, 4'), 7.80-7.79 (d, 1H, Ar—H, 2), 7.42-7.40 (dd, 1H, Ar—H, 3), 7.37-7.29, 7.21-7.20 (m, 5H, Ar—H, 9, 10, 11, 12, 13) 7.26 (solvent peak), 6.80-6.78 (d, 2H, Ar—H, 5, 5'), 4.69 (s, 2H, —CH$_2$—, 8), 3.65-3.59 (q, 4H, —CH$_2$—, 6), 1.61 (water peak), 1.33-1.29 (t, 3H, —CH$_3$, 7).

Example 15

A benzothiazole disperse dye with a structural formula shown below is provided,

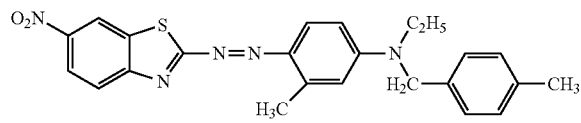

A synthetic route is:

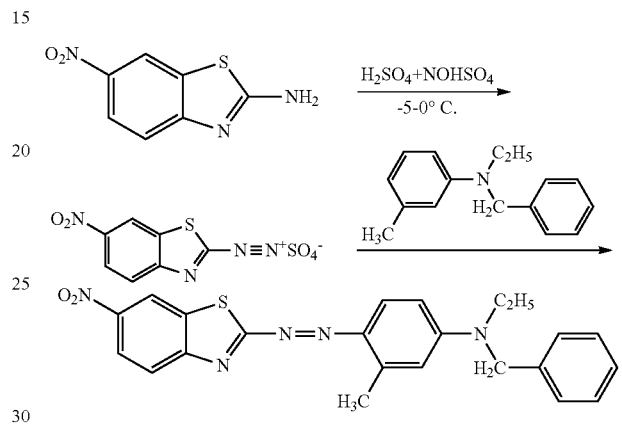

A preparation method of the benzothiazole disperse dye includes the following steps:

(1) performing a diazo reaction, wherein conditions were the same as those in step (1) in Example 3;

(2) performing a coupling reaction, wherein conditions were the same as those in step (2) in Example 13;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 7.96-7.93 (m, 3H, Ar—H, 1, 4, 4'), 7.79-7.78 (d, 1H, Ar—H, 2), 7.41-7.38 (dd, 1H, Ar—H, 3), 7.26 (solvent peak), 6.74-6.72 (d, 2H, Ar—H, 5, 5'), 3.52-3.47 (q, 4H, —CH$_2$—, 6, 6'), 1.67 (water peak), 1.28-1.24 (t, 6H, —CH$_3$, 7, 7').

Example 16

A benzothiazole disperse dye with a structural formula shown below is provided,

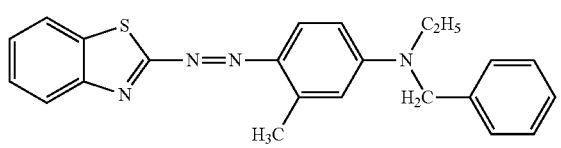

A synthetic route is:

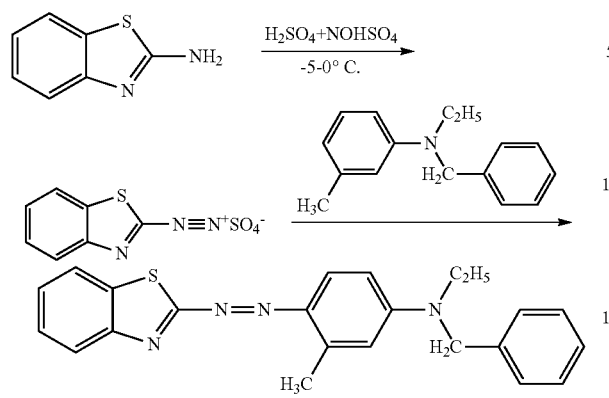

A preparation method of the benzothiazole disperse dye includes the following steps:
(1) performing a diazo reaction, wherein conditions were the same as those in step (1) in Example 4;
(2) performing a coupling reaction, wherein conditions were the same as those in step (2) in Example 13;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 12:
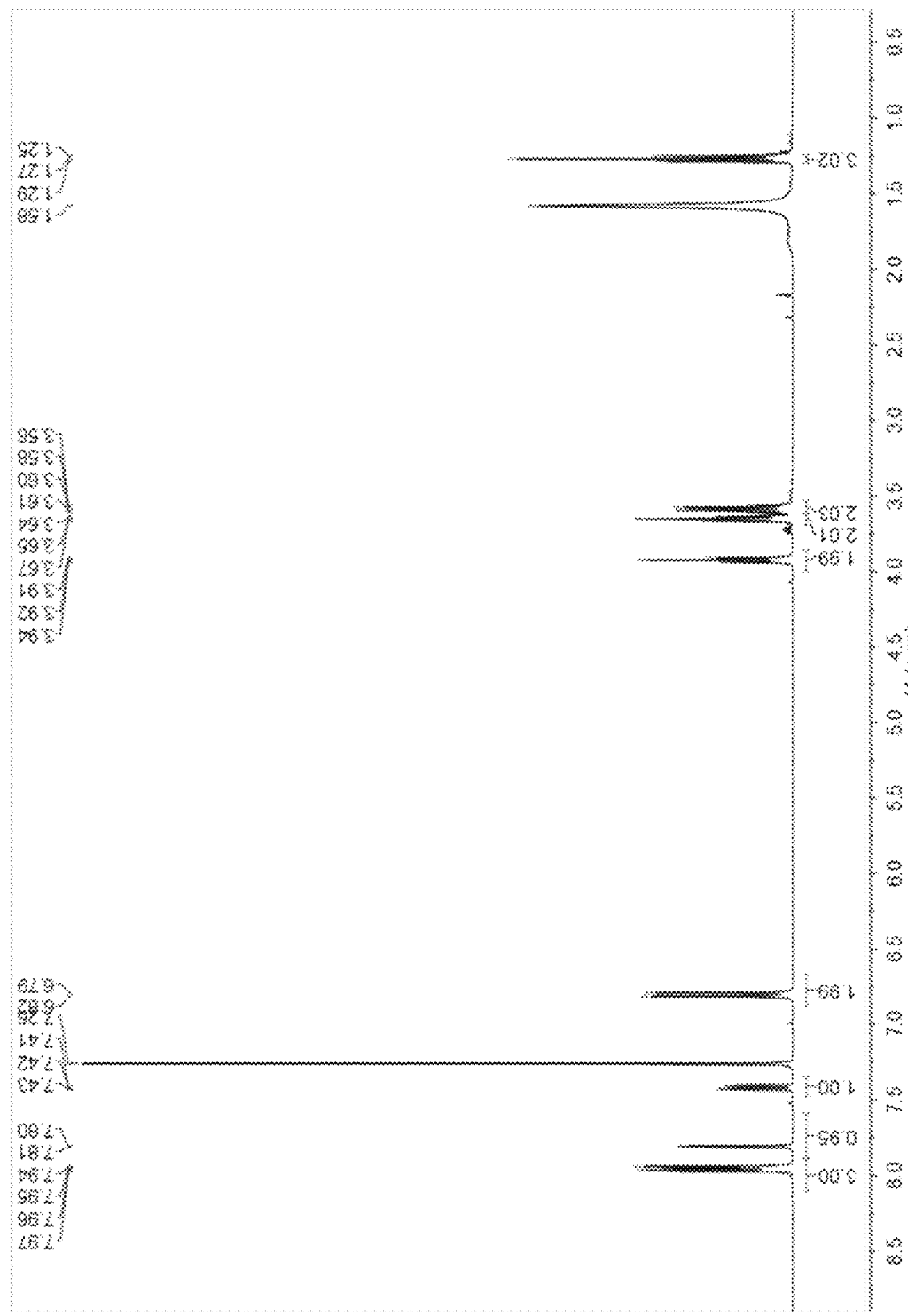
FIG. 12 is a hydrogen nuclear magnetic resonance spectrum of a benzothiazole disperse dye obtained in Example 16.

Structural characterization is performed on the obtained benzothiazole disperse dye, and results (FIG. 12) of hydrogen nuclear magnetic resonance spectrum are:

$^1$H NMR (400 MHz, CDCl$_3$) δ 7.97-7.94 (m, 3H, Ar—H, 1, 4, 4'), 7.81-7.80 (d, 1H, Ar—H, 2), 7.43-7.40 (dd, 1H, Ar—H, 3), 7.26 (solvent peak), 6.82-6.79 (d, 2H, Ar—H, 5, 5'), 3.94-3.91 (t, 2H, —CH$_2$—, 8), 3.67-3.64 (t, 2H, —CH$_2$—, 9), 3.61-3.56 (q, 2H, —CH$_2$—, 6), 1.56 (water peak), 1.29-1.25 (t, 3H, —CH$_3$, 7).

Example 17

A benzothiazole disperse dye with a structural formula shown below is provided,

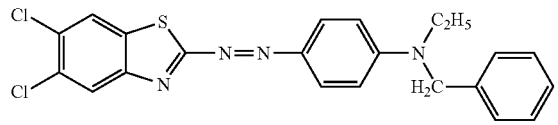 [SMILES: CCN(Cc1ccccc1)c1ccc(N=Nc2nc3cc(Cl)c(Cl)cc3s2)cc1]

A synthetic route is:

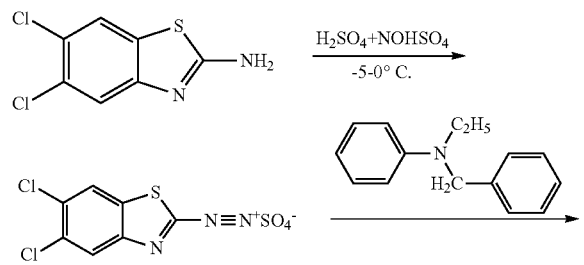

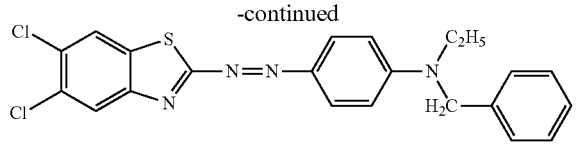

A preparation method of the benzothiazole disperse dye includes the following steps:
(1) performing a diazo reaction, wherein conditions were the same as those in step (1) in Example 1;
(2) performing a coupling reaction, wherein "N-ethyl-N-p-methylphenylaniline" in step (2) in Example 1 was changed into "N-ethyl-N-benzylaniline", and other conditions were the same as those in step (2) in Example 1;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.75-8.74 (d, 1H, Ar—H, 1), 8.33-8-31 (dd, 1H, Ar—H, 2), 8.11-8.09 (d, 1H, Ar—H, 3), 8.00-7.97 (d, 2H, Ar—H, 4), 7.26 (solvent peak), 7.18-7.08 (dd, 4H, Ar—H, 9, 10, 11, 12), 6.83-6.81 (d, 2H, Ar—H, 5), 4.69 (s, 2H, —CH$_2$—, 8), 3.67-3.61 (q, 2H, —CH$_2$—, 6), 2.35 (s, 3H, —CH$_3$, 13), 1.54 (water peak), 1.34-1.31 (t, 3H, —CH$_3$, 7).

Example 18

A benzothiazole disperse dye with a structural formula shown below is provided,

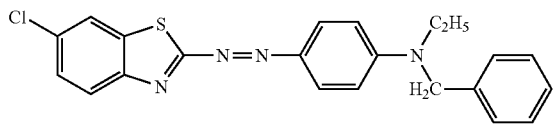

A synthetic route is:

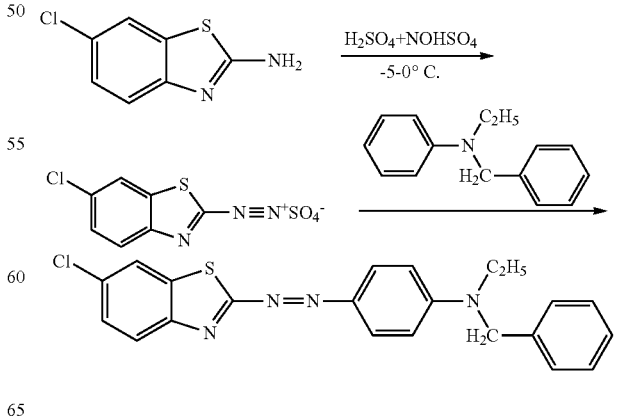

A preparation method of the benzothiazole disperse dye includes the following steps:

(1) performing a diazo reaction, wherein conditions were the same as those in step (1) in Example 2;
(2) performing a coupling reaction, wherein conditions were the same as those in step (2) in Example 17;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 13:
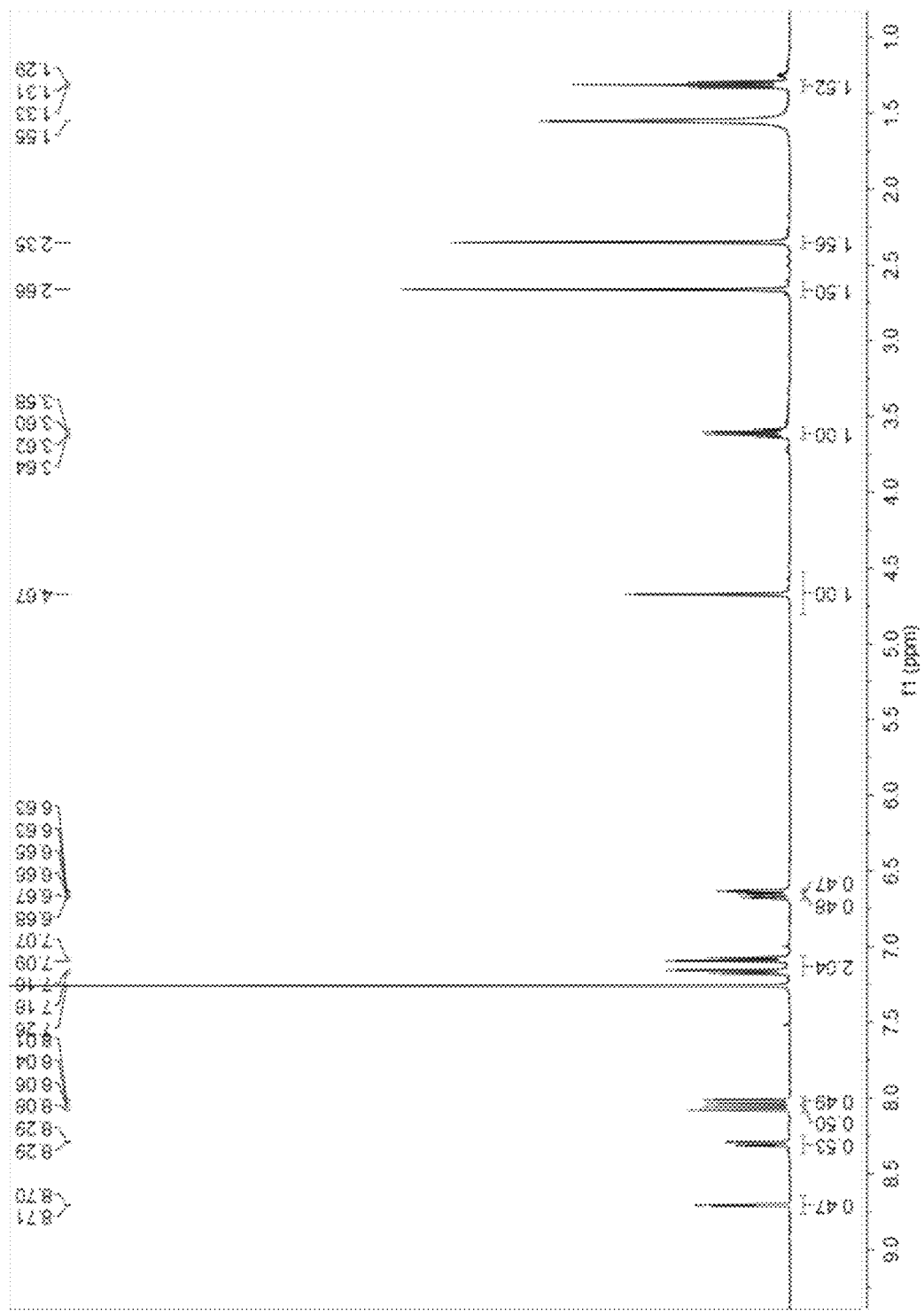
FIG. 13 is a hydrogen nuclear magnetic resonance spectrum of a benzothiazole disperse dye obtained in Example 18.

Structural characterization is performed on the obtained benzothiazole disperse dye, and results (FIG. 13) of hydrogen nuclear magnetic resonance spectrum are:

$^1$H NMR (400 MHz, CDCl$_3$) δ 8.71-8.70 (d, 1H, Ar—H, 1), 8.32-8.29 (dd, 1H, Ar—H, 3), 8.08-8.06 (d, 1H, Ar—H, 2), 8.04-8.01 (d, 1H, Ar—H, 4), 7.26 (solvent peak), 7.18-7.07 (dd, 4H, Ar—H, 11, 12, 13, 14), 6.68-6.65 (dd, 1H, Ar—H, 5), 6.63 (d, 1H, Ar—H, 6), 4.67 (s, 2H, —CH$_2$—, 10), 3.64-3.58 (q, 2H, —CH$_2$—, 8), 2.66 (s, 3H, —CH$_3$, 7), 2.35 (s, 3H, —CH$_3$, 15), 1.55 (water peak), 1.33-1.29 (t, 3H, —CH$_3$, 9).

Example 19

A benzothiazole disperse dye with a structural formula shown below is provided,

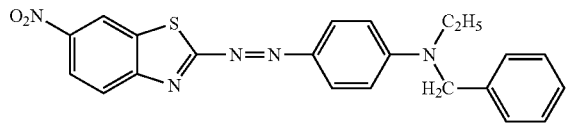 [SMILES: CCN(Cc1ccccc1)c1ccc(N=Nc2nc3ccc([N+](=O)[O-])cc3s2)cc1]

A synthetic route is:

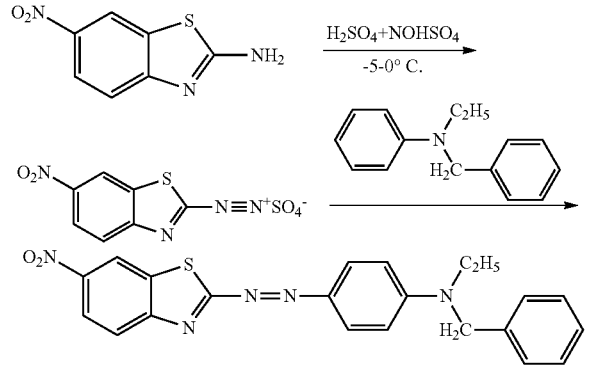

A preparation method of the benzothiazole disperse dye includes the following steps:
(1) performing a diazo reaction, wherein conditions were the same as those in step (1) in Example 3;
(2) performing a coupling reaction, wherein conditions were the same as those in step (2) in Example 17;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.69 (d, 1H, Ar—H, 1), 8.30-8.27 (dd, 1H, Ar—H, 3), 8.07-8.05 (d, 1H, Ar—H, 2), 8.02-8.00 (d, 1H, Ar—H, 4) 7.38-7.28, 7.21-7.19 (m, 5H, Ar—H, 11, 12, 1314, 15), 7.26 (solvent peak), 6.68-6.65 (dd, 1H, Ar—H, 5), 6.63-6.62 (d, 1H, Ar—H, 6), 4.71 (s, 2H, —CH$_2$—, 10), 3.65-3.60 (q, 2H, —CH$_2$—, 8), 2.65 (s, 3H, —CH$_3$, 7) 1.60 (water peak), 1.34-1.30 (t, 3H, —CH$_3$, 9).

Example 20

A benzothiazole disperse dye with a structural formula shown below is provided,

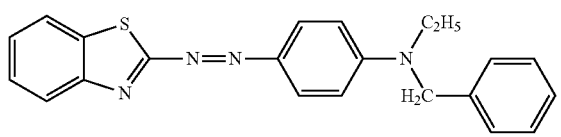 [SMILES: CCN(Cc1ccccc1)c1ccc(N=Nc2nc3ccccc3s2)cc1]

A synthetic route is:

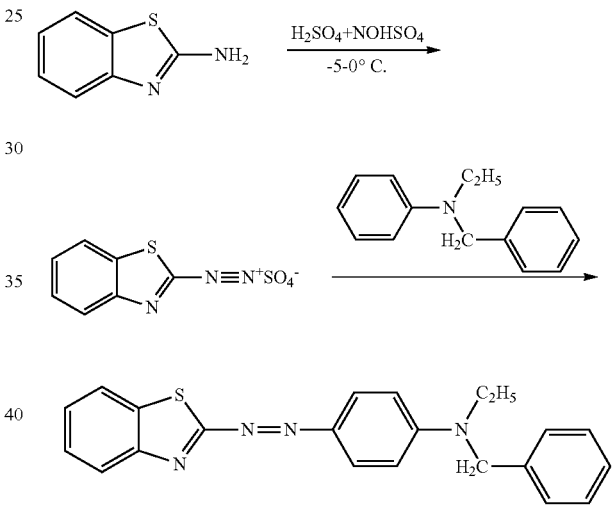

A preparation method of the benzothiazole disperse dye includes the following steps:
(1) performing a diazo reaction, wherein conditions were the same as those in step (1) in Example 3;
(2) performing a coupling reaction, wherein conditions were the same as those in step (2) in Example 17;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 14:
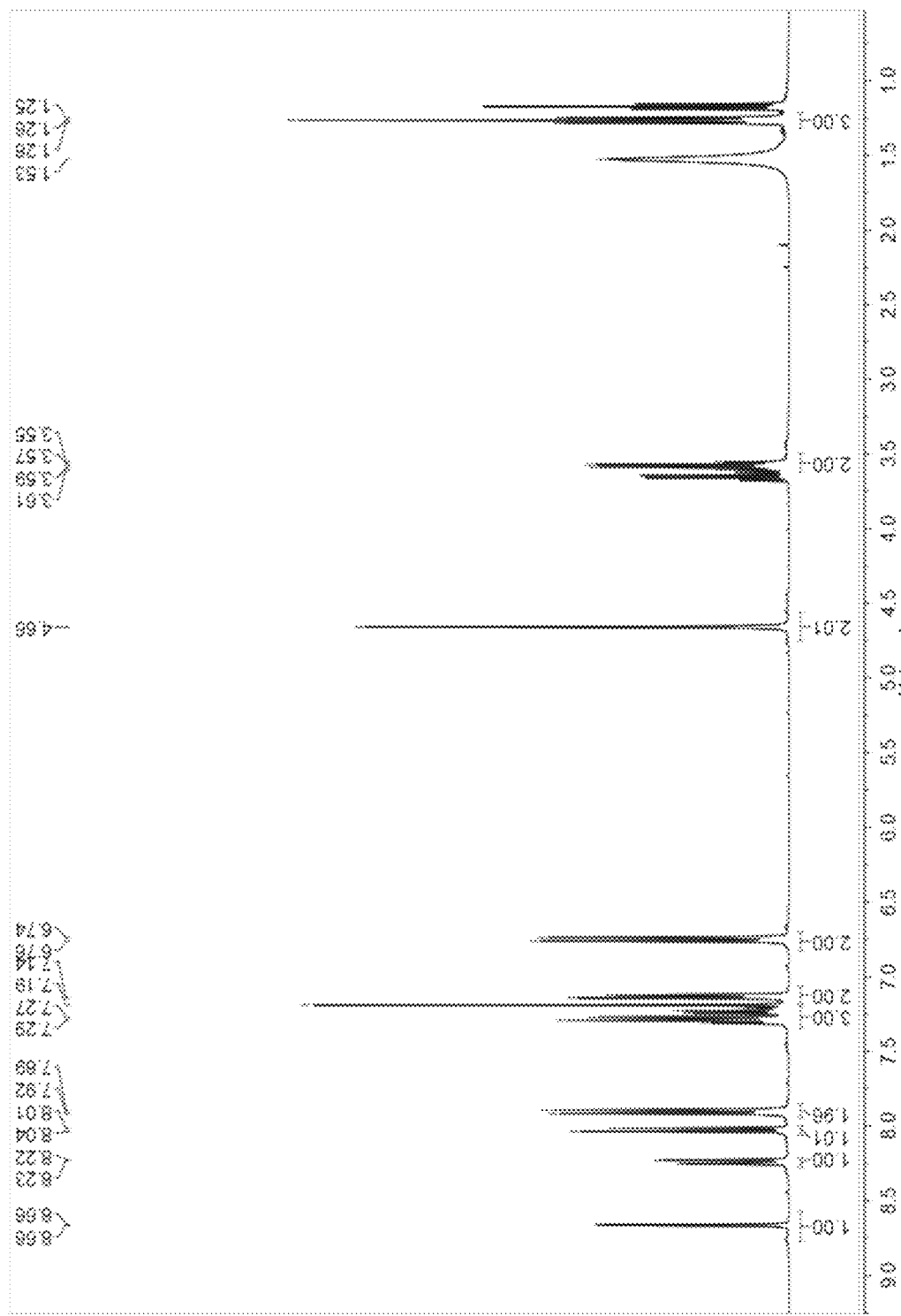
FIG. 14 is a hydrogen nuclear magnetic resonance spectrum of a benzothiazole disperse dye obtained in Example 20.

Structural characterization is performed on the obtained benzothiazole disperse dye, and results (FIG. 14) of hydrogen nuclear magnetic resonance spectrum are:

$^1$H NMR (400 MHz, CDCl$_3$) δ 8.73 (d, 1H, Ar—H, 1), 8.32-8.29 (dd, 1H, Ar—H, 3), 8.11-8.08 (d, 1H, Ar—H, 2), 7.99-7.96 (d, 2H, Ar—H, 4, 4') 7.38-7.28, 7.21-7.19 (m, 5H, Ar—H, 9, 10, 11, 12, 13), 7.26 (solvent peak), 6.83-6.81 (d, 2H, Ar—H, 5, 5'), 4.73 (s, 2H, —CH$_2$—, 8), 3.68-3.62 (q, 2H, —CH$_2$—, 6), 1.60 (water peak), 1.35-1.32 (t, 3H, —CH$_3$, 7).

Example 21

A benzothiazole disperse dye with a structural formula shown below is provided,

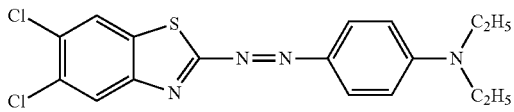

A synthetic route is:

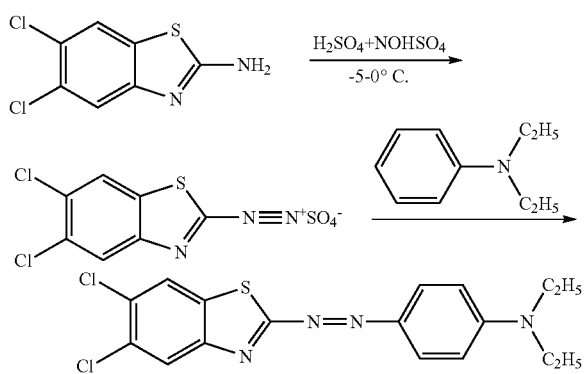

A preparation method of the benzothiazole disperse dye includes the following steps:

(1) performing a diazo reaction, wherein conditions were the same as those in step (1) in Example 1;

(2) performing a coupling reaction, wherein "N-ethyl-N-p-methylphenylaniline" in step (2) in Example 1 was changed into "N,N-diethylaniline", and other conditions were the same as those in step (2) in Example 1;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.71-8.71 (d, 1H, Ar—H, 1), 8.30-8.27 (dd, 1H, Ar—H, 3), 8.08-8.06 (d, 1H, Ar—H, 2), 7.98-7.96 (d, 2H, Ar—H, 4, 4'), 7.26 (solvent peak), 6.67-6.74 (d, 2H, Ar—H, 5, 5'), 3.56-3.51 (q, 4H, —CH$_2$—, 6, 6'), 1.64 (water peak), 1.31-1.28 (t, 3H, —CH$_3$, 7, 7').

Example 22

A benzothiazole disperse dye with a structural formula shown below is provided,

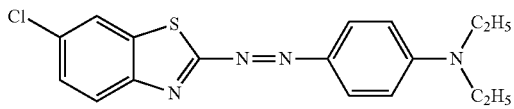

A synthetic route is:

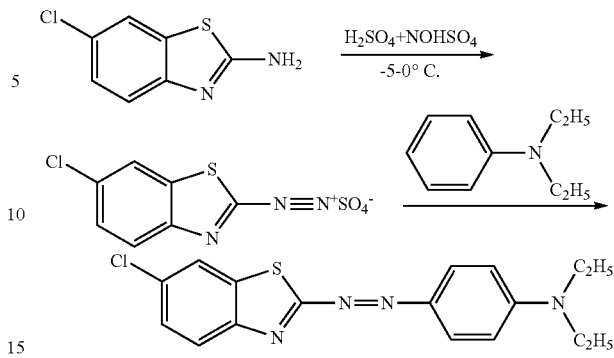

A preparation method of the benzothiazole disperse dye includes the following steps:

(1) performing a diazo reaction, wherein conditions were the same as those in step (1) in Example 2;

(2) performing a coupling reaction, wherein conditions were the same as those in step (2) in Example 21;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.72-8.72 (d, 1H, Ar—H, 1), 8.31-8.29 (dd, 1H, Ar—H, 3), 8.10-8.07 (d, 1H, Ar—H, 2), 7.96-7.94 (d, 2H, Ar—H, 4, 4'), 7.26 (solvent peak), 6.83-6.80 (d, 2H, Ar—H, 5, 5'), 3.96-3.93 (t, 2H, —CH$_2$—, 8), 3.70-3.67 (t, 2H, —CH$_2$—, 9), 3.64-3.59 (q, 2H, —CH$_2$—, 6), 1.61 (water peak), 1.31-1.27 (t, 3H, —CH$_3$, 7).

Example 23

A benzothiazole disperse dye with a structural formula shown below is provided,

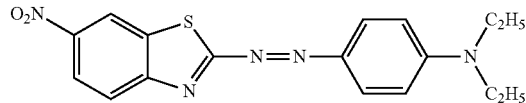

A synthetic route is:

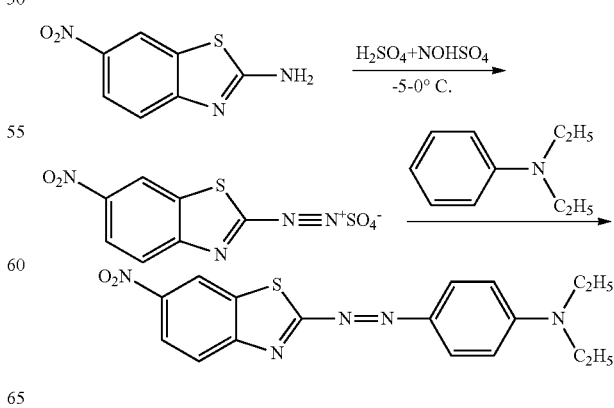

A preparation method of the benzothiazole disperse dye includes the following steps:

(1) performing a diazo reaction, wherein conditions were the same as those in step (1) in Example 3;

(2) performing a coupling reaction, wherein conditions were the same as those in step (2) in Example 21;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.08-8.06 (d, 1H, Ar—H, 1), 7.97-7.95 (d, 2H, Ar—H, 3, 3'), 7.84-7.82 (d, 1H, Ar—H, 2), 7.51-7.33 (m, 2H, Ar—H, 4, 4'), 7.26 (solvent peak), 7.17-7.09 (dd, 4H, Ar—H, 9, 10, 11, 12), 6.80-6.78 (d, 2H, Ar—H, 5, 5'), 4.65 (s, 2H, —CH$_2$—, 8), 3.63-3.58 (q, 2H, —CH$_2$—, 6), 2.34 (s, 3H, —CH$_3$, 13), 1.54 (water peak), 1.32-1.28 (t, 3H, —CH$_3$, 7).

Example 24

A benzothiazole disperse dye with a structural formula shown below is provided,

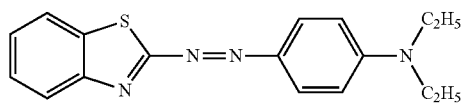

A synthetic route is:

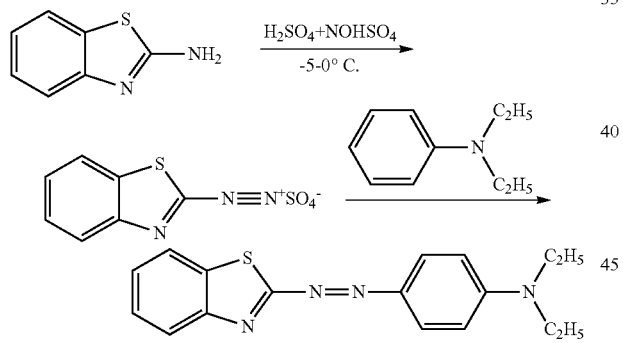

A preparation method of the benzothiazole disperse dye includes the following steps:

(1) performing a diazo reaction, wherein conditions were the same as those in step (1) in Example 4;

(2) performing a coupling reaction, wherein conditions were the same as those in step (2) in Example 21;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 15:
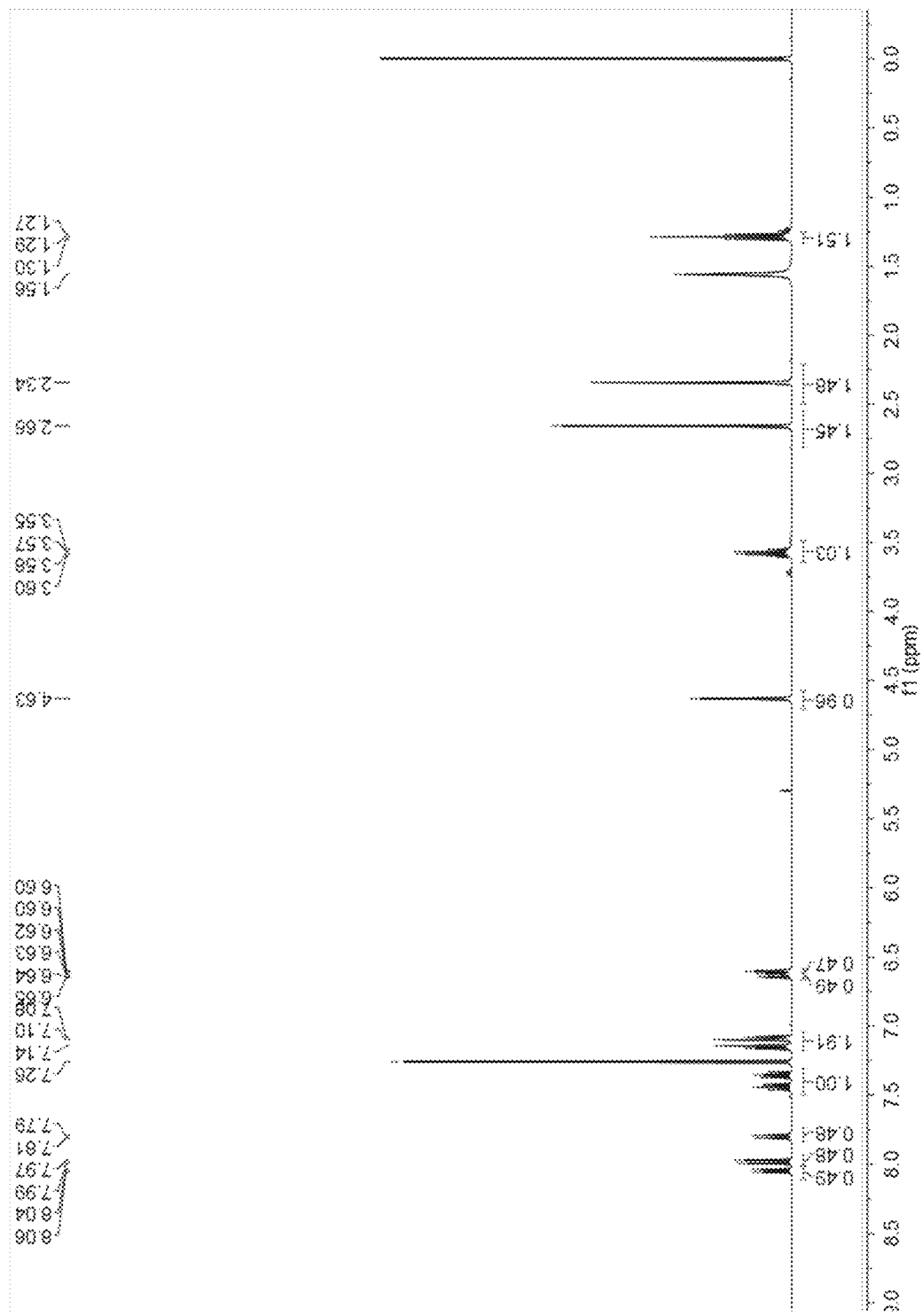
FIG. 15 is a hydrogen nuclear magnetic resonance spectrum of a benzothiazole disperse dye obtained in Example 24.

Structural characterization is performed on the obtained benzothiazole disperse dye, and results (FIG. 15) of hydrogen nuclear magnetic resonance spectrum are:

$^1$H NMR (400 MHz, CDCl$_3$) δ 8.06-8.04 (d, 1H, Ar—H, 2), 7.99-7.97 (d, 1H, Ar—H, 1), 7.81-7.79 (d, 1H, Ar—H, 4), 7.50-7.31 (m, 2H, Ar—H, 3, 3'), 7.26 (solvent peak), 7.16-7.08 (dd, 4H, Ar—H, 11, 12, 13, 14), 6.65-6.65 (dd, 1H, Ar—H, 5), 6.60 (d, 1H, Ar—H, 6), 4.63 (s, 2H, —CH$_2$—, 10), 3.60-3.55 (q, 2H, —CH$_2$—, 8), 2.66 (s, 3H, —CH$_3$, 7), 2.34 (s, 3H, —CH$_3$, 15), 1.56 (water peak), 1.30-1.27 (t, 3H, —CH$_3$, 9).

Example 25

A benzothiazole disperse dye with a structural formula shown below is provided,

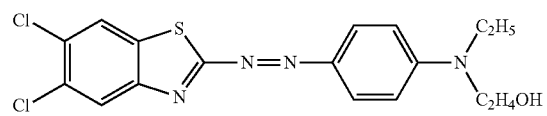

A synthetic route is:

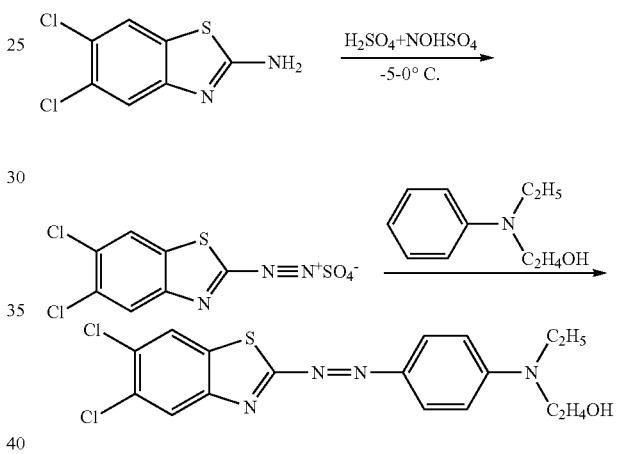

A preparation method of the benzothiazole disperse dye includes the following steps:

(1) performing a diazo reaction, wherein conditions were the same as those in step (1) in Example 1;

(2) performing a coupling reaction, wherein "N-ethyl-N-p-methylphenylaniline" in step (2) in Example 1 was changed into "N-ethyl-N-hydroxyethylaniline", and other conditions were the same as those in step (2) in Example 1;

(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 16:
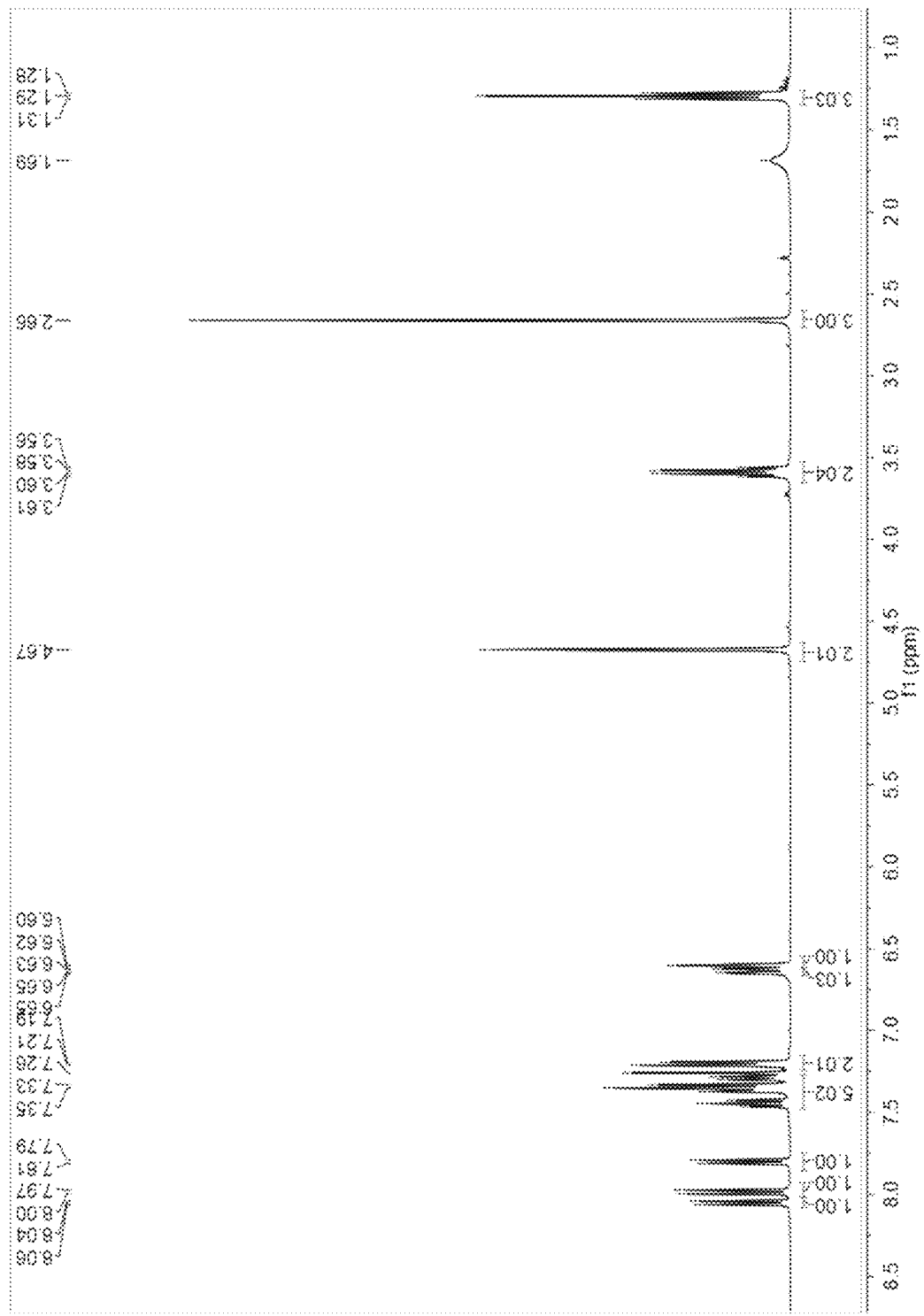
FIG. 16 is a hydrogen nuclear magnetic resonance spectrum of a benzothiazole disperse dye obtained in Example 25.

Structural characterization is performed on the obtained benzothiazole disperse dye, and results (FIG. 16) of hydrogen nuclear magnetic resonance spectrum are:

$^1$H NMR (400 MHz, CDCl$_3$) δ 8.06-8.04 (d, 1H, Ar—H, 2), 8.00-7.97 (d, 1H, Ar—H, 1), 7.81-7.79 (d, 1H, Ar—H, 4), 7.46-7.28 (m, 5H, Ar—H, 11, 12, 13, 14, 15), 7.26 (solvent peak), 7.21-7.19 (d, 2H, Ar—H, 3, 3'), 6.65-6.62 (dd, 1H, Ar—H, 5), 6.60-6.59 (d, 1H, Ar—H, 6), 4.67 (s, 2H, —CH$_2$—, 10), 3.61-3.56 (q, 2H, —CH$_2$—, 8), 2.66 (s, 3H, —CH$_3$, 7), 1.69 (water peak), 1.31-1.28 (t, 3H, —CH$_3$, 9).

Example 26

A benzothiazole disperse dye with a structural formula shown below is provided,

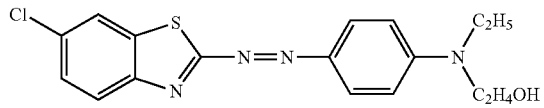

A synthetic route is:

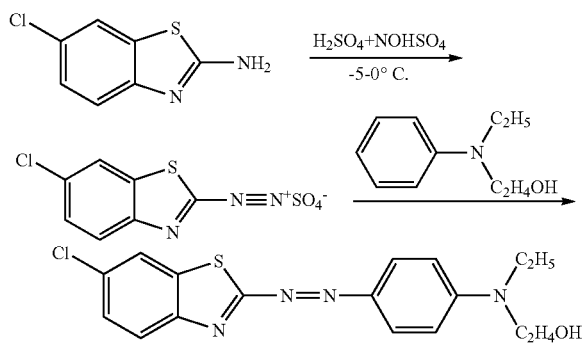

A preparation method of the benzothiazole disperse dye includes the following steps:
(1) performing a diazo reaction, wherein conditions were the same as those in step (1) in Example 2;
(2) performing a coupling reaction, wherein conditions were the same as those in step (2) in Example 25;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 17:
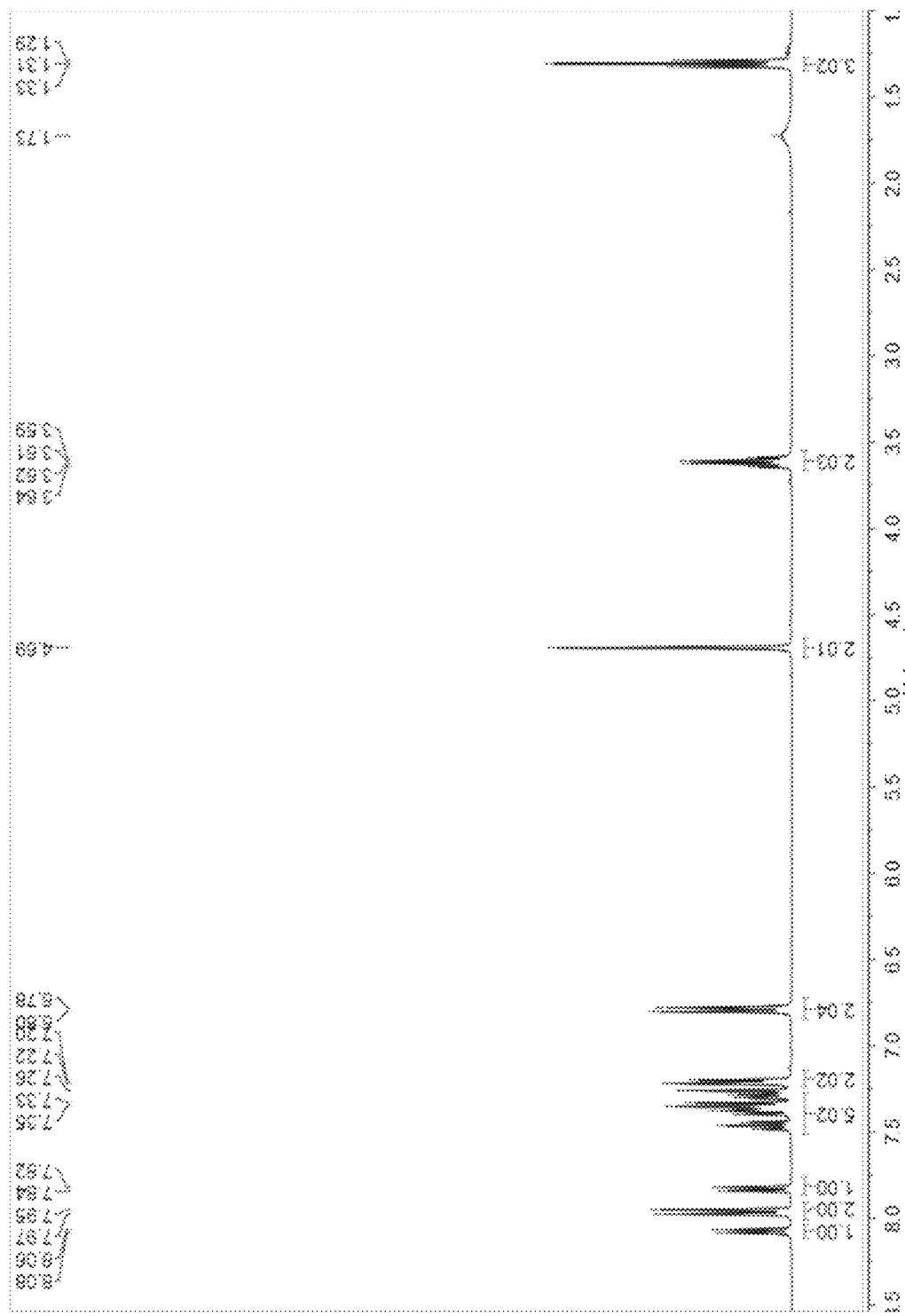
FIG. 17 is a hydrogen nuclear magnetic resonance spectrum of a benzothiazole disperse dye obtained in Example 26.

Structural characterization is performed on the obtained benzothiazole disperse dye, and results (FIG. 17) of hydrogen nuclear magnetic resonance spectrum are:

$^1$H NMR (400 MHz, CDCl$_3$) δ 8.08-8.06 (d, 1H, Ar—H, 2), 7.97-7.95 (d, 2H, Ar—H, 4, 4'), 7.84-7.82 (d, 1H, Ar—H, 1), 7.48-7.28 (m, 5H, Ar—H, 9, 10, 11, 12, 13), 7.26 (solvent peak), 7.22-7.20 (d, 2H, Ar—H, 3, 3'), 6.80-6.78 (d, 2H, Ar—H, 5, 5'), 4.69 (s, 2H, —CH$_2$—, 8), 2.64-3.59 (q, 3H, —CH$_2$—, 6), 1.73 (water peak), 1.33-1.29 (t, 3H, —CH$_3$, 7).

Example 27

A benzothiazole disperse dye with a structural formula shown below is provided,

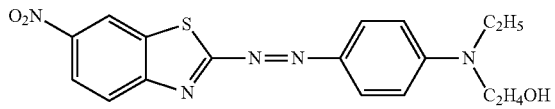

A synthetic route is:

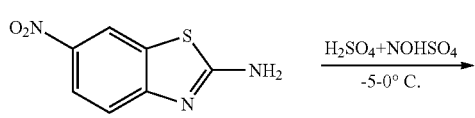

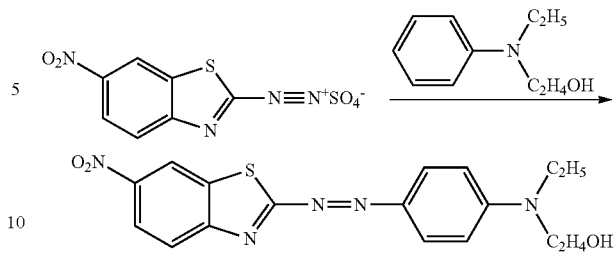

A preparation method of the benzothiazole disperse dye includes the following steps:
(1) performing a diazo reaction, wherein conditions were the same as those in step (1) in Example 3;
(2) performing a coupling reaction, wherein conditions were the same as those in step (2) in Example 25;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Structural characterization is performed on the obtained benzothiazole disperse dye, and results of hydrogen nuclear magnetic resonance spectrum are:

$^1$H NMR (400 MHz, CDCl$_3$) δ 8.07-8.05 (d, 1H, Ar—H, 2), 7.98-7.96 (d, 2H, Ar—H, 4, 4'), 7.84-7.82 (d, 1H, Ar—H, 1), 7.47-7.35 (dt, 2H, Ar—H, 3, 3'), 7.26 (solvent peak), 6.74-6.72 (d, 2H, Ar—H, 5, 5'), 3.52-3.46 (q, 4H, —CH$_2$—, 6, 6'), 1.65 (water peak), 1.27-1.24 (t, 6H, —CH$_3$, 7, 7').

Example 28

A benzothiazole disperse dye with a structural formula shown below is provided,

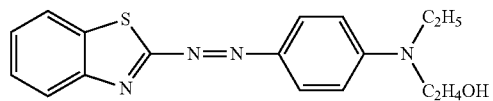

A synthetic route is:

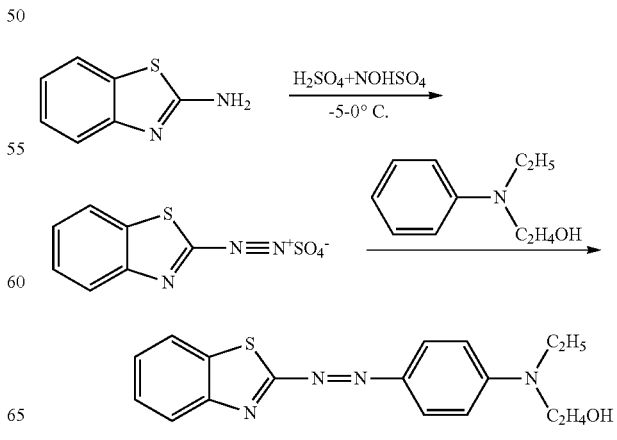

A preparation method of the benzothiazole disperse dye includes the following steps:
(1) performing a diazo reaction, wherein conditions were the same as those in step (1) in Example 4;
(2) performing a coupling reaction, wherein conditions were the same as those in step (2) in Example 25;
(3) dissolving a filter cake obtained in step (2) in a 95% ethanol solution (the filter cake can be dissolved in the ethanol solution), and performing reflux at 70° C. for 2 h, cooling, recrystallization, filtration and drying to obtain a benzothiazole disperse dye.

Figure 18:
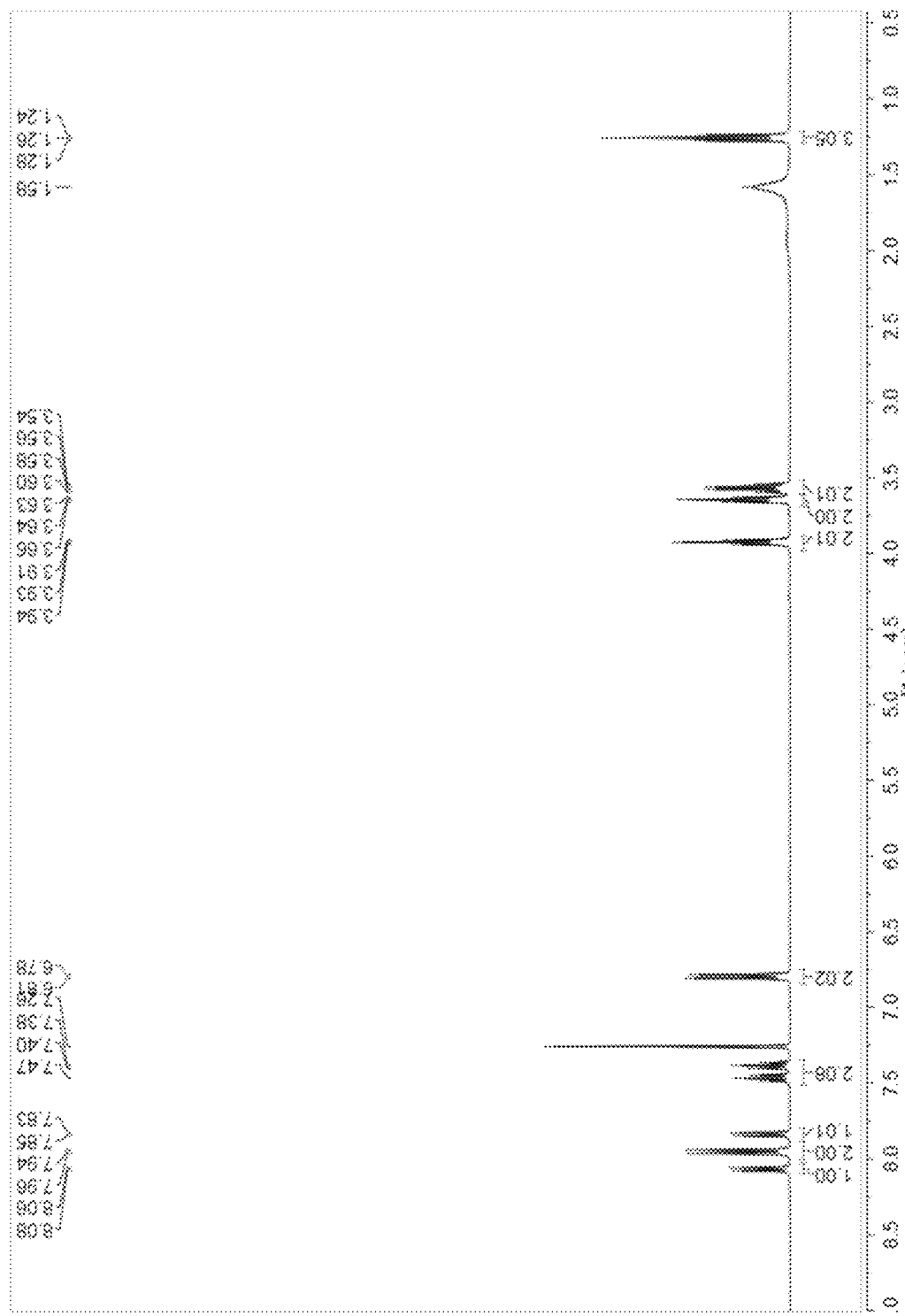
FIG. 18 is a hydrogen nuclear magnetic resonance spectrum of a benzothiazole disperse dye obtained in Example 28.

Structural characterization is performed on the obtained benzothiazole disperse dye, and results (FIG. 18) of hydrogen nuclear magnetic resonance spectrum are:

$^1$H NMR (400 MHz, CDCl$_3$) δ 8.08-8.06 (d, 1H, Ar—H, 2), 7.96-7.94 (d, 2H, Ar—H, 4, 4'), 7.85-7.83 (d, 1H, Ar—H, 1), 7.49-7.37 (dt, 2H, Ar—H, 3, 3'), 7.26 (solvent peak), 6.81-6.78 (d, 2H, Ar—H, 5, 5'), 3.94-3.91 (t, 2H, —CH$_2$—, 8), 3.66-3.63 (t, 2H, —CH$_2$—, 9), 3.60-3.54 (q, 2H, —CH$_2$—, 6), 1.58 (water peak), 1.28-1.24 (t, 3H, —CH$_3$, 7).

Comparative Example 1

The alkali resistance, oxidation resistance, washing resistance, rubbing resistance, sunlight resistance and color fastness to sublimation of conventional monoazo disperse dyes (disperse red 2B, disperse yellow BRL and disperse blue BBLS) are shown in Table 1:

TABLE 1

Related properties of dyes

| | Dye number or name | Alkali resistance | | Oxidation resistance | Washing resistance | Rubbing resistance | Sunlight resistance | Sublimation resistance |
|---|---|---|---|---|---|---|---|---|
| | | Highest pH resistant value | Highest hydrogen NaOH resistant concentration (g/L) | Highest peroxide resistant concentration (g/L) | | | | |
| Example | 1 | 12 | 1 | 5 | 4-5 | 4-5 | 4-5 | 3-4 |
| | 2 | 9 | 0 | 0 | 4 | 4-5 | 5 | 5 |
| | 3 | 9 | 0 | 0 | 4-5 | 4 | 4-5 | 4-5 |
| | 4 | 9 | 0 | 0 | 4 | 4-5 | 4-5 | 4-5 |
| | 5 | 12 | 3 | 5 | 4-5 | 4-5 | 6 | 5 |
| | 6 | 12 | 3 | 5 | 4-5 | 5 | 7 | 5 |
| | 7 | 9 | 0 | 0 | 4 | 4-5 | 6-7 | 5 |
| | 8 | 13 | 10 | 5 | 5 | 4-5 | 6 | 4-5 |
| | 9 | 13 | 10 | 5 | 5 | 5 | 6-7 | 4 |
| | 10 | 13 | 10 | 5 | 4-5 | 5 | 7 | 4-5 |
| | 11 | 13 | 10 | 5 | 5 | 5 | 6-7 | 5 |
| | 12 | 12 | 1 | 5 | 4-5 | 4-5 | 2-3 | 4 |
| | 13 | 12 | 1 | 5 | 5 | 4-5 | 5-6 | 4 |
| | 14 | 12 | 1 | 5 | 4 | 4 | 7 | 4 |
| | 15 | 13 | 1 | 5 | 4-5 | 4-5 | 3 | 4 |
| | 16 | 13 | 10 | 5 | 4 | 4 | 5 | 4 |
| | 17 | 13 | 1 | 5 | 4 | 4 | 5 | 4 |
| | 18 | 13 | 1 | 5 | 4 | 4 | 5 | 4 |
| | 19 | 9 | 1 | 5 | 4 | 4 | 5-6 | 4-5 |
| | 20 | 12 | 10 | 5 | 4 | 4 | 5-6 | 4-5 |
| | 21 | 13 | 10 | 0 | 4 | 4 | 6 | 4-5 |
| | 22 | 13 | 10 | 0 | 5 | 5 | 6 | 5 |
| | 23 | 12 | 10 | 0 | 5 | 5 | 6 | 4-5 |
| | 24 | 13 | 8 | 5 | 5 | 5 | 3-4 | 4-5 |
| | 25 | 12 | 8 | 5 | 4-5 | 4-5 | 3-4 | 5 |
| | 26 | 12 | 10 | 5 | 4-5 | 4-5 | 4 | 4-5 |
| | 27 | 12 | 1 | 5 | 4-5 | 4-5 | 4 | 5 |
| | 28 | 12 | 1 | 5 | 4-5 | 4-5 | 5 | 5 |
| Comparative Example | Disperse red 2B | 6 | 0 | 0 | 5 | 5 | 7 | 5 |
| | Disperse yellow BRL | 6 | 0 | 0 | 4-5 | 5 | 4-5 | 4-5 |
| | Disperse blue BBLS | 6 | 0 | 0 | 4-5 | 4-5 | 6 | 4-5 |

Note:
A test of color fastness to rubbing, a test of color fastness to washing a test of color fastness to sunlight and a test of color fastness to sublimation are performed based on relevant regulations of GB/T3920.2008 Textiles-Color Fastness Test-Color Fastness to Rubbing, AATCC TM 61-2009 Corlorfastness to Laundering: Accelerated A2, GB/T8427.2008 Textiles-Test for Color Fastness-Color Fastness to Artificial Light: Xenon Arc Fading Lamp Test and GB/T6152-1997 Textiles-Tests for Color Fastness-Color Fastness to Hot Pressing respectively.

By comparing Examples 1-28 and the comparative example in Table 1, it can be seen that among benzothiazole disperse dyes designed and synthesized in Examples 1-28, the color and luster of the disperse dye with the lowest alkali resistance in a dye bath when the pH is 9 are still stable, and the alkali resistance is higher than that of conventional disperse dyes; among the benzothiazole disperse dyes designed and synthesized in Examples 1-28, the oxidation resistance of the benzothiazole disperse dye with the highest pH resistant value greater than or equal to 10 when the pH=10 is higher than that of conventional disperse dyes, and the highest hydrogen peroxide resistant concentration can reach 5 g/L. In addition, various kinds of fastness of the benzothiazole disperse dyes designed and synthesized in Examples 1-28 are excellent.

The benzothiazole heterocyclic azo disperse dyes designed and synthesized in Examples 1-28 have high brightness, bright color, stable luster and other spectral properties; azo alkali-resistant disperse dyes with 2-aminobenzothiazole and derivatives as the diazo component and aniline derivatives as the coupling component are synthesized based on structural design of the dyes, the alkali resistance and oxygen bleaching resistance of the heterocyclic azo disperse dyes can be improved by introducing different groups to the coupling component, an alkali resistance sequence and an oxidation resistance sequence of the disperse dyes after different substituents are introduced are determined, and structural characteristics of the benzothiazole disperse dyes with high alkali resistance and high oxidation resistance are obtained; a reference is provided for structural design of disperse dyes with alkali resistance and oxidation resistance, and disperse dyes capable of meeting requirements of a one-bath process for cotton bleaching and disperse dyeing of a polyester-cotton blended fabric or a one-bath process for alkali deweighting and disperse dyeing of polyester fabrics are determined; besides, according to the method for improving the alkali resistance and oxidation resistance of benzothiazole disperse dyes provided in the examples, compared with conventional dyes, the alkali resistance and oxidation resistance of the disperse dyes are higher; under a dyeing condition of 10 g/L of sodium hydroxide or 5 g/L of hydrogen peroxide, a K/S value of a polyester knitted fabric dyed with these disperse dyes is still stable, and requirements of the one-bath process for cotton bleaching and disperse dyeing of a polyester-cotton blended fabric or the one-bath process for alkali deweighting and disperse dyeing of polyester fabrics for the disperse dyes can be met; a dyeing and finishing process flow of a polyester-cotton blended fabric and a polyester fabric is simplified, requirements of energy saving and emission reduction in the textile industry are met, and good social and economic benefits can be obtained.

Unless otherwise specified, solvents of solutions in the examples are all water.

What is claimed is:

1. A benzothiazole disperse dye having the following structural formula:

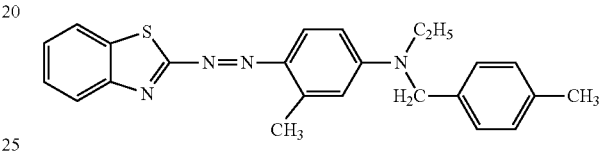

* * * * *